US010111200B2

(12) United States Patent
Zhang et al.

(10) Patent No.: US 10,111,200 B2
(45) Date of Patent: Oct. 23, 2018

(54) INFRASTRUCTURE EQUIPMENT AND METHODS

(71) Applicant: SONY CORPORATION, Tokyo (JP)

(72) Inventors: Lei Zhang, Weybridge (GB); Ayesha Ijaz, Weybridge (GB); Atta Ul Quddus, Weybridge (GB); Muhammad Ali Imran, Weybridge (GB); Hideji Wakabayashi, Basingstoke (GB); Jussi Tapani Kahtava, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/511,540

(22) PCT Filed: Aug. 6, 2015

(86) PCT No.: PCT/EP2015/068154
§ 371 (c)(1),
(2) Date: Mar. 15, 2017

(87) PCT Pub. No.: WO2016/050401
PCT Pub. Date: Apr. 7, 2016

(65) Prior Publication Data
US 2017/0289957 A1 Oct. 5, 2017

(30) Foreign Application Priority Data
Sep. 29, 2014 (EP) .................................. 14186922

(51) Int. Cl.
H04W 68/02 (2009.01)
H04W 52/14 (2009.01)
(Continued)

(52) U.S. Cl.
CPC ............. *H04W 68/02* (2013.01); *H04W 8/02* (2013.01); *H04W 52/143* (2013.01);
(Continued)

(58) Field of Classification Search
CPC . H04W 52/143; H04W 52/247; H04W 68/02; H04W 88/04; H04W 88/08; H04W 8/02
See application file for complete search history.

(56) References Cited

U.S. PATENT DOCUMENTS 7,760,704 B2 * 7/2010 Menon .................. H04W 68/00
342/457
7,983,696 B1 * 7/2011 Manghat ............. H04W 52/322
455/458
(Continued)

FOREIGN PATENT DOCUMENTS

GB 2487757 A 8/2012
GB 2487780 A 8/2012
(Continued)

OTHER PUBLICATIONS

H. Holma, et al., "LTE for UMTS OFDMA and SC-FDMA Based Radio Access," Jan. 2010, 4 pages.
(Continued)

Primary Examiner — Babar Sarwar
(74) Attorney, Agent, or Firm — Xsensus LLP

(57) ABSTRACT

An infrastructure equipment as part of a mobile communications network receives an indication that data is to be transmitted to one of communications devices. In response the infrastructure equipment transmits a first paging message to the communications device to indicate the communications device is to receive the data via a wireless access interface. If a response to the transmitted first paging message is not received within a predetermined time, then if the infrastructure equipment can use a power boosting mode, to transmit the first paging message with a boosted power, or if the infrastructure equipment cannot use a power boosted mode for transmitting, to transmit a second paging message to one or more communications apparatus which can operate as a relay node for the communications device. The second (Continued)

paging message identifies the relay node and the communications device for which the infrastructure equipment is to transmit the data.

16 Claims, 10 Drawing Sheets

(51) Int. Cl.
*H04W 8/02* (2009.01)
*H04W 52/24* (2009.01)
*H04W 88/08* (2009.01)
*H04W 88/04* (2009.01)

(52) U.S. Cl.
CPC .......... *H04W 52/247* (2013.01); *H04W 88/04* (2013.01); *H04W 88/08* (2013.01)

(56) References Cited

U.S. PATENT DOCUMENTS

| | | | | |
|---|---|---|---|---|
| 8,238,956 | B1* | 8/2012 | Tang | H04W 52/325 |
| | | | | 370/310 |
| 8,254,920 | B1* | 8/2012 | Oroskar | H04W 28/24 |
| | | | | 455/432.1 |
| 8,855,566 | B2* | 10/2014 | Chang | H04W 72/085 |
| | | | | 370/328 |
| 2005/0277429 | A1* | 12/2005 | Laroia | H04W 68/025 |
| | | | | 455/458 |
| 2010/0009675 | A1* | 1/2010 | Wijting | H04W 76/023 |
| | | | | 455/426.1 |
| 2010/0011110 | A1* | 1/2010 | Doppler | H04W 76/14 |
| | | | | 709/228 |
| 2011/0044183 | A1 | 2/2011 | Huang et al. | |
| 2011/0044213 | A1 | 2/2011 | Venkatachalam et al. | |
| 2011/0044229 | A1 | 2/2011 | Etemad et al. | |
| 2011/0044244 | A1 | 2/2011 | Etemad | |
| 2011/0044265 | A1 | 2/2011 | Wang et al. | |
| 2011/0044266 | A1 | 2/2011 | Shrivastava et al. | |
| 2011/0044286 | A1 | 2/2011 | Jain | |
| 2011/0044307 | A1 | 2/2011 | Mohanty et al. | |
| 2011/0045763 | A1 | 2/2011 | Mohanty et al. | |
| 2011/0047289 | A1 | 2/2011 | Venkatachalam et al. | |
| 2011/0058531 | A1 | 3/2011 | Jain et al. | |
| 2011/0098043 | A1* | 4/2011 | Yu | H04W 60/00 |
| | | | | 455/435.1 |
| 2011/0117907 | A1* | 5/2011 | Hooli | H04W 72/02 |
| | | | | 455/422.1 |
| 2011/0122833 | A1 | 5/2011 | Venkatachalam et al. | |
| 2011/0134827 | A1* | 6/2011 | Hooli | H04W 72/04 |
| | | | | 370/315 |
| 2012/0178485 | A1* | 7/2012 | Zeira | H04W 4/08 |
| | | | | 455/515 |
| 2013/0044661 | A1* | 2/2013 | Jokimies | H04W 52/0274 |
| | | | | 370/311 |
| 2013/0170347 | A1* | 7/2013 | Zhang | H04W 4/70 |
| | | | | 370/230 |
| 2013/0172036 | A1* | 7/2013 | Miklos | H04W 8/005 |
| | | | | 455/517 |
| 2013/0315129 | A1* | 11/2013 | Kim | H04W 52/0216 |
| | | | | 370/312 |
| 2013/0344903 | A1* | 12/2013 | Li | H04W 4/08 |
| | | | | 455/458 |
| 2014/0140296 | A1* | 5/2014 | Choi | H04J 11/0036 |
| | | | | 370/329 |
| 2014/0148153 | A1* | 5/2014 | Gleixner | H04W 4/005 |
| | | | | 455/426.1 |
| 2014/0148204 | A1 | 5/2014 | Zeira et al. | |
| 2015/0092741 | A1 | 4/2015 | Zeira et al. | |
| 2017/0135067 | A1* | 5/2017 | Su | H04W 68/02 |

FOREIGN PATENT DOCUMENTS

| | | |
|---|---|---|
| GB | 2487782 A | 8/2012 |
| GB | 2487906 A | 8/2012 |
| GB | 2487907 A | 8/2012 |
| GB | 2487908 A | 8/2012 |
| GB | 2487909 A | 8/2012 |
| GB | 2488513 A | 9/2012 |
| GB | 2493703 A | 2/2013 |
| GB | 2497743 A | 6/2013 |
| WO | 2015/180890 A2 | 12/2015 |
| WO | 2016/008657 A1 | 1/2016 |

OTHER PUBLICATIONS

"Updated SID on: Provision of low-cost MTC UEs based on LTE", RP-121441 (Vodafone), TSG RAN meeting #57, 2012, 6 pages.

"3rd Generation Partnership Project; Technical Specification Group Radio Access Network; Study on provision of low-cost Machine-Type Communications (MTC) User Equipments (UEs) based on LTE," 3GPP TR 36.888, V12.0.0, 2013, XP-002749419, 55 pages.

A. Ijaz, et al., "LTE MTC Research Project Report on Year-1 Achievements," 2013, 46 pages.

"Coverage enhancement by downlink power-density boosting for low-cost MTC UEs," R1-130237, 3GPP TSG RAN WG1 #72, 2013, 10 pages, XP 050663373.

International Search Report dated Nov. 10, 2015 in PCT/EP2015/068154.

* cited by examiner

Example deployment of an ad hoc relay node in which UE receives UL assistance only Example deployment of UEs and operation of an ad hoc relay node, no UL or PL assistance, UL only assistance, and UL and DL assistance Structure of VC-PDSCH without PSD boosting PDSCH PSD boosting by unloading RBs from either sides of central 6 RBs Procedure at relay node (RN discovery case 1)

Procedure at relay node (RN discovery case 2)

INFRASTRUCTURE EQUIPMENT AND METHODS

CROSS-REFERENCE TO RELATED APPLICATIONS

The present application is based on PCT filing PCT/EP2015/068154 filed Aug. 6, 2015, and claims priority to European Patent Application 14 186 922.2, filed in the European Patent Office on Sep. 29, 2014, the entire contents of each of which being incorporated herein by reference.

TECHNICAL FIELD OF THE DISCLOSURE

The present disclosure relates to communications devices and methods for communicating data using communications devices, and also to communications apparatus which operate as relay nodes and methods for communicating via a relay node. The present disclosure also relates to infrastructure equipment, which forms part of a mobile communications network and methods of communicating using infrastructure equipment.

BACKGROUND OF THE DISCLOSURE

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on. Other examples include medical devices which are continuously or intermittently transmitting data such as for example measurements or readings from monitors via a communications network to a server, and automotive applications in which measurement data is gathered from sensors on a vehicle and transmitted via a mobile communications network to a server attached to the network.

Whilst it can be convenient for a terminal such as an MTC type terminal to take advantage of the wide coverage area provided by a third or fourth generation mobile telecommunication network, there are at present disadvantages and challenges to successful deployment. Unlike a conventional third or fourth generation communications device such as a smartphone, an MTC-type terminal is preferably relatively simple and inexpensive, having a reduced capability. In addition MTC-devices are often deployed in situations that do not afford easy access for direct maintenance or replacement, so that reliable and efficient operation can be crucial. Furthermore, while the type of functions performed by the MTC-type terminal (e.g. collecting and reporting back data) do not require particularly complex processing to perform, third and fourth generation mobile telecommunication networks typically employ advanced data modulation techniques (such as 16QAM or 64QAM) on the radio interface which can require more complex and expensive radio transceivers to implement.

It is usually justified to include such complex transceivers in a smartphone as a smartphone will typically require a powerful processor to perform typical smartphone type functions. However, as indicated above, there is now a desire to use relatively inexpensive and less complex devices to communicate using LTE type networks. Accordingly such devices may be low power or battery operated and therefore have a reduced transmission power capability compared with more conventional devices. Such MTC devices may also be deployed in remote locations where radio propagation conditions may be poor so that radio signals transmitted by the MTC device may be less likely to be receivable by a base station.

SUMMARY OF THE DISCLOSURE

According to an example embodiment of the present technique there is provided an infrastructure equipment, which forms part of a mobile communications network for transmitting data to communications devices or receiving data from communications devices. The infrastructure equipment comprises a transmitter configured to transmit signals representing data to the communications devices via a wireless access interface, a receiver configured to receive signals from the communications devices via the wireless access interface, and a controller for controlling the transmitter and the receiver to receive an indication that data is to be transmitted to one of the communications devices, and in response to transmit a first paging message to the communications device to indicate that the communications device is to receive the data via the wireless access interface. If a response to the transmitted first paging message is not received within a predetermined time, then if the infrastructure is able to use a power boosting mode, to transmit the first paging message with a boosted power, or if the infrastructure equipment is not able to use a power boosted mode for transmitting, to transmit a second paging message to one or more communications apparatus which can operate as a relay node for the communications device. The second paging message identifies the relay node and the communications device for which the infrastructure equipment is to transmit the data.

Embodiments of the present technique can provide an arrangement in which an infrastructure equipment which forms part of a mobile communications network and comprises a transmitter for transmitting signals to communications devices via a wireless access interface, and a receiver for receiving signals from the one or more communications devices via the wireless access interface and a controller. The controller is configured to determine that data is to be transmitted to one of the communications devices, to detect that the communications device is one of the predetermined type of communications devices, such as an MTC device, to transmit a paging message to the communications device to indicate that the communications device is to receive the data via the wireless access interface (on the downlink). If the controller in combination with the receiver does not receive a response to the transmitted paging message within a predetermined time the controller determines whether the infrastructure equipment is able to transmit the paging message with a boosted transmission power and if the infrastructure equipment is able to transmit the paging message with a booster transmission power to increase the transmission power of the transmitted paging message or if the infrastructure equipment cannot increase the transmission power in accordance with the boosted power level or if the controller in combination with the receiver does not receive a response to the paging message transmitted with the boosted transmission power from the communications device to transmit a second paging message to one or more communications apparatus which can operate as a relay node for the communications device to the effect of informing the communications apparatus that it is to transmit the second paging message to the communications device.

The embodiments of the technique can provide an arrangement for transmitting data to a communications device on the downlink where that communications device is a predetermined type of limited mobility or capability to receive downlink signals. According to the present technique after the infrastructure equipment has attempted to transmit a paging message to the communications device and has not received a response from the communications device within a predetermined time, having determined that the communications device is of the predetermined type, the infrastructure equipment then attempts to transmit the paging message with an increased power in accordance with a boosted power node. This is in contrast to a conventional arrangement in which if the communications device is not of the predetermined type then the infrastructure would arrange for the paging message to be transmitted by other infrastructure equipment within a tracking area. However the infrastructure equipment itself may not be able to perform a boosted power transmission because of various reasons such as the infrastructure equipment does not have the capability to perform the boosted power transmission or the boosted power transmission is not available at a certain time of the day. However, even after transmitting the paging message with a boosted power the communications device may not be able to receive the boosted power transmission message at its location. This may be because the communications device is a device of reduced capability, but this may apply to conventional communications devices. Accordingly, after attempting to transmit the paging message with the boosted power which has not been received for a predetermined time or if the infrastructure equipment is not able to transmit the paging message with a boosted power then the infrastructure equipment transmits a second paging message to one or more communications apparatus which can act as a relay node within a coverage area provided by the infrastructure equipment.

The infrastructure equipment may comprise a base station with a transmitter and receiver and a mobility manager or mobility management entity, which contains the information, which contains the type of the communications device. In one example the infrastructure equipment provides a plurality of base stations each of which may be able to transmit the paging message with a boosted power mode or not and in accordance with the capability of the base station to transmit the paging message with a booster power the mobility management entity may control the transmission of the paging message to reflect the power transmission.

Accordingly, the embodiments of the present technique can provide an optimised arrangement for transmitting a downlink message to contact a communications device where that communications device may not be able to receive the downlink transmission. In one example the device of the predetermined type may be an MTC type device.

Various further aspects and features of the present technique are defined in the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
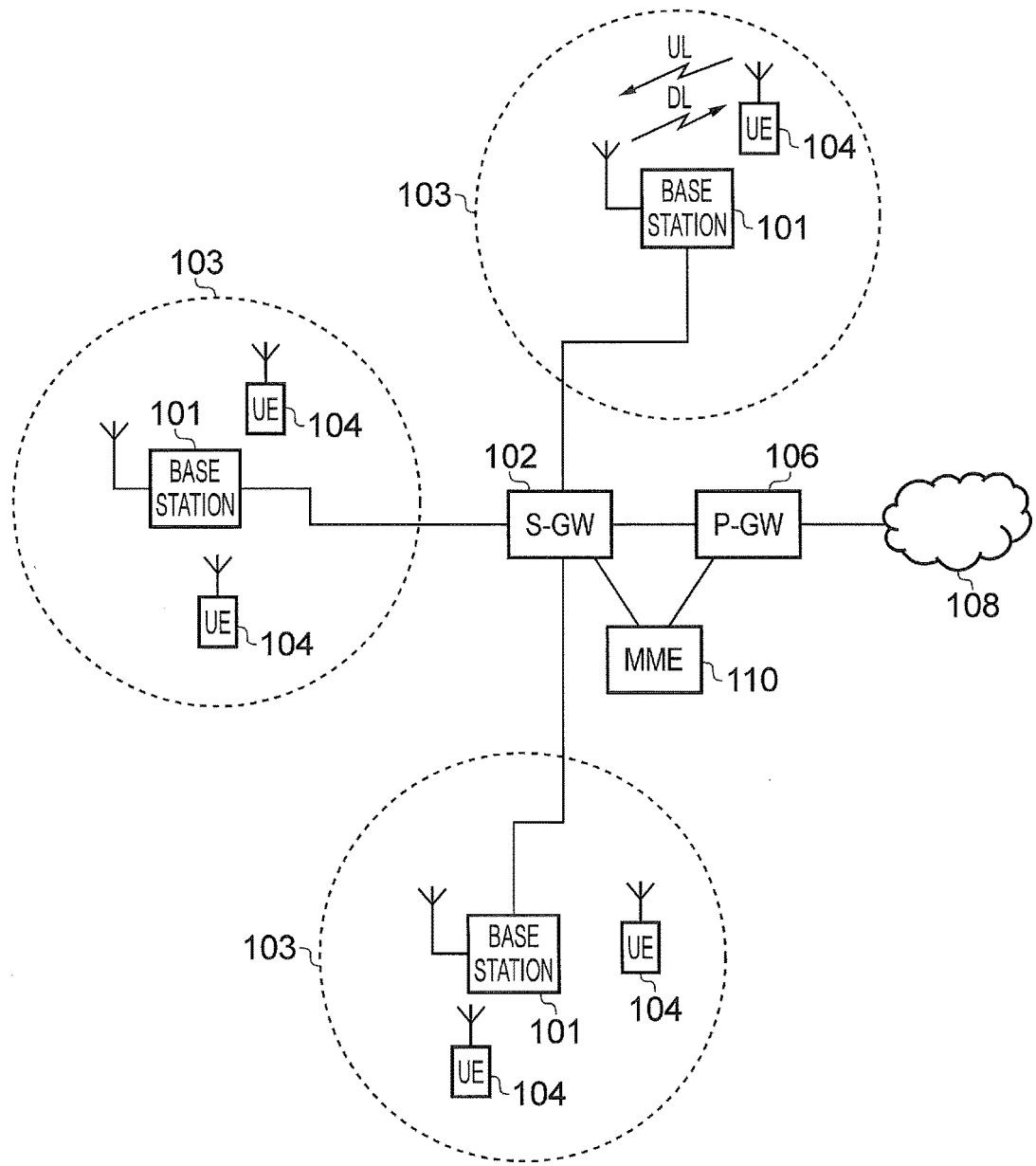
FIG. 1 provides a schematic diagram of a mobile communications system according to an example of an LTE standard.

Hereinafter preferred embodiments of the present technique will be described in detail with reference to the appended drawings. Note that, in this specification and appended drawings, structural elements that have substantially the same function and structure are denoted with the same reference numerals, and repeated explanation of these structural elements is omitted.

Example Communications System

FIG. 1 provides a schematic diagram illustrating some basic functionality of a conventional mobile telecommunications network, using for example a 3GPP defined UMTS and/or Long Term Evolution (LTE) architecture. The mobile telecommunications network/system 100 of FIG. 1 operates in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

As can be seen in FIG. 1, the network includes a plurality of base stations 101 connected to a core network, which includes in the present example a serving gateway (S-GW) 102 which is connected to each of the base stations (eNodeBs (eNBs)), a packet data gateway (P-GW) 106 and a mobility management entity (MME) 110. As those acquainted with LTE will appreciate, the packet data gateway 106 acts as a gateway with an external network 108. Each base station provides a coverage area 103 (i.e. a cell) within which data can be communicated to and from communications devices (also referred to as mobile terminals, MT or User Equipment, (UE) 104. Data is transmitted from base stations 101 to communications devices 104 within their respective coverage areas 103 via a radio downlink. Data is transmitted from communications devices 104 to the base stations 101 via a radio uplink. The serving gateway 102 routes data to and from the communications devices 104 via the respective base stations 101 from and to the packet data gateway 106. The mobility management entity 110 controls operations and functions to support the mobility of the communications devices 104 communicating via the mobile communications network. The packet data gateway 106 provides functions such as authentication, charging and so on.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

The base stations 101 of FIG. 1 may be realised as any type of evolved Node B (eNodeB) such as a macro eNodeB and a small eNodeB. The small eNodeB may be an eNodeB such as a pico eNodeB, a micro eNodeB, and a home (femto) eNodeB that covers a cell smaller than a macro cell. Instead, the base station 101 may be realized as any other types of base stations such as a NodeB and a base transceiver station (BTS). The base station 101 may include a main body (that is also referred to as a base station apparatus) configured to control radio communication, and one or more remote radio heads (RRH) disposed in a different place from the main body. In addition, various types of terminals, which will be described below, may each operate as the base station 101 by temporarily or semi-persistently executing a base station function.

Any of the communications devices 104 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The communications device 104 may also be realized as a terminal (that is also referred to as a machine type communication (MTC) terminal) that performs machine-to-machine (M2M) communication. Furthermore, the terminal apparatus 104 may be a radio communication module (such as an integrated circuit module including a single die) mounted on each of the terminals Relay Technologies Relay technologies are known generally to provide an arrangement for receiving signals from a base station and for retransmitting the received signals to a UE in a mobile communications network, or to receive signals transmitted from a UE for re-transmission to a base station of a mobile communications network. As a result of such an arrangement a radio coverage area provided by an mobile communications network can be extended by a relay node to reach communications devices which would otherwise be out of range of the mobile communications network.

As explained above, it is desirable to extend the normal coverage of eNodeBs for machine type communications (MTC) UEs that are typically located in locations where they experience significant penetration losses. For example, electric and gas meters are often installed in locations where they suffer from poor network coverage, such as in the basements of residential buildings, beneath the staircase or even underground (below a manhole cover). To ensure MTC applications in such challenging locations, 3GPP initially identified the need for 20 dB improvement in coverage for low-cost MTC devices in comparison to defined LTE cell coverage footprint at the beginning of its study item, however finally settled on a lower value of 15 dB. For MTC coverage extension, power spectral density (PSD) boosting has been studied extensively along with other approaches such as repetition coding and it is noted that MTC UEs in extreme coverage scenarios might have characteristics such as very low data rate, greater delay tolerance and no mobility.

As disclosed in our co-pending European patent application EP14170122.7, a multi-RAT uplink relay assisted transmission arrangement can be provided in which a relay node is used to assist a UE in relaying uplink transmission by receiving signals from a UE and re-transmitting the signals to an eNodeB, as if the relay node were a UE (the content of which are incorporated herein by reference). In this concept the MTC UE is able to receive downlink physical channels from the eNodeB but needs a relay node to relay its uplink transmissions to the eNodeB. In the downlink, coverage extension techniques, such as power boosting, may be employed so that a UE can receive the downlink signals from the eNodeB with sufficient signal strength. Accordingly the down-link follows LTE signalling protocols. However, on the uplink the UE is not able to reach or chooses not to reach the eNodeB so that there is no direct connection between the MTC UE and the eNodeB. In this regard, relay nodes (relay nodes) are deployed to facilitate the communication for two main reasons:

Energy saving due to less transmitting used by the MTC devices;

Coverage extension for those MTC devices in hostile radio environment.

If the MTC devices cannot establish LTE uplink connection with the eNodeB, they can communicate with the eNodeB via one or multiple relay nodes using radio interface technologies that are potentially different from LTE, e.g. WiFi, LTE-U etc. An arrangement can therefore be provided in which communications devices which are out of coverage range of an eNodeB for uplink and downlink transmissions at least can discover relay nodes which are either fixed relay nodes or ad hoc relay nodes. A communications device can discover one or more relay nodes within a vicinity through which radio communications are possible via a radio access interface which is different to a radio access interface which it would use to communicate with a base station of a mobile communications network. The communications device then transmits a relay assist request assistance message to the relay node which responds by performing a random access procedure as if the relay node was a communications device operating in accordance with a first wireless access interface of the mobile communications network. Following a successful random access procedure, the relay node then performs a radio resource connection establishment procedure in which it identifies the communications device for which relay assisted communications has been requested and acquires an identity of a base station. The relay node then transmits to the communications device the identity of the base station so that communications device and the base station can communicate in accordance with a first wireless access interface using the relay node which transmits and receives signals to the UE via a second wireless access interface.

Figure 2A:
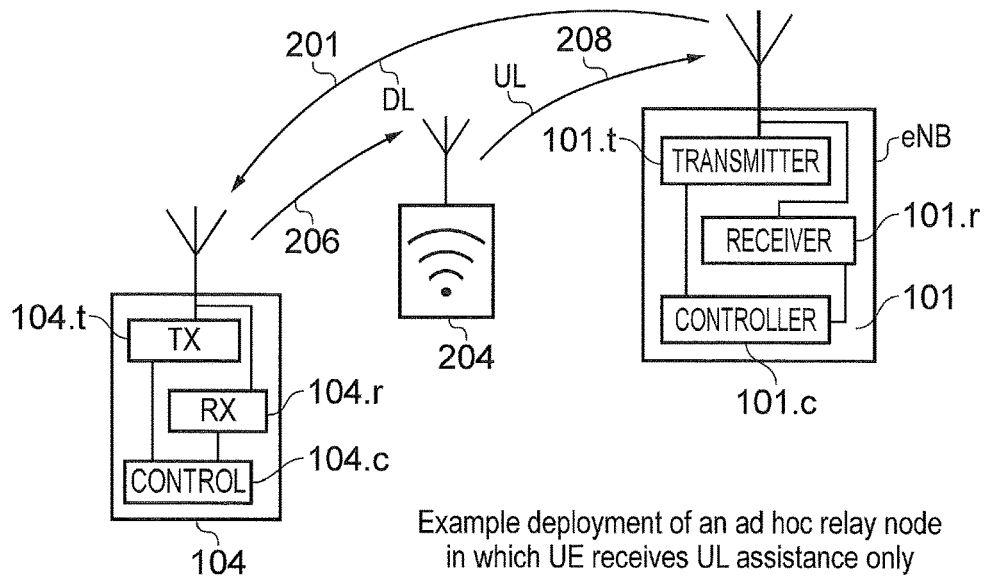
FIG. 2a provides a schematic diagram of a communications device (UE) communicating with a mobile communications network via a communications apparatus operating as a relay node, in which uplink assistance is provided by the relay node.
Figure 2B:
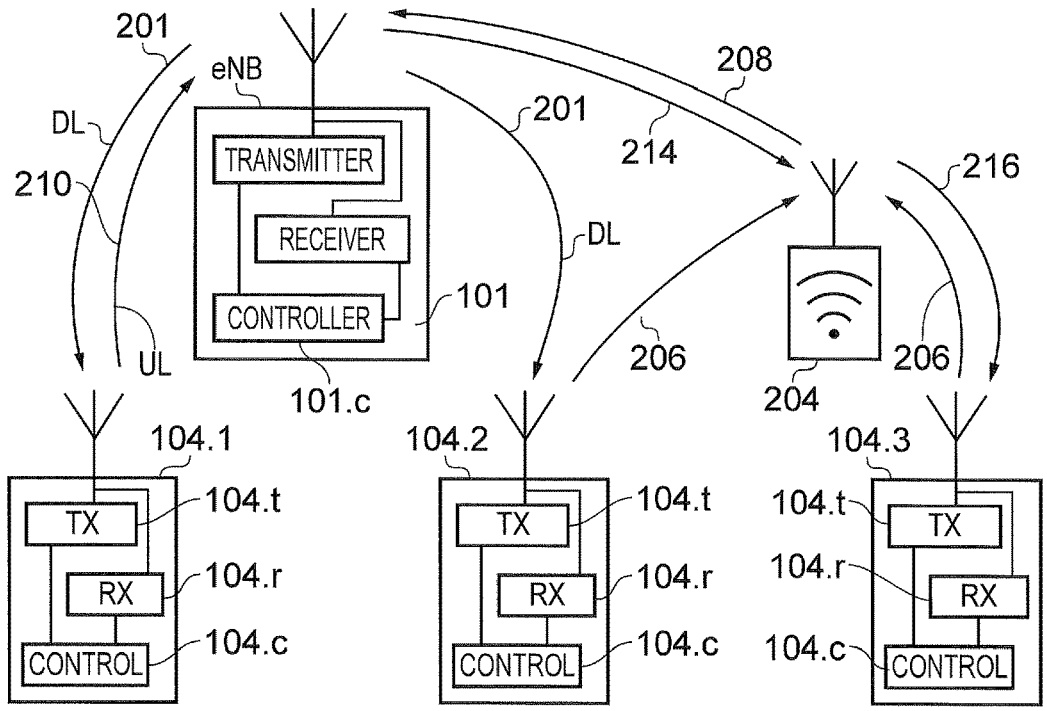
FIG. 2b is a schematic block diagram illustrating different scenarios in which a relay nodes provides assistance for transmitting on the uplink only, the downlink as well as the uplink.

FIGS. 2a and 2b provide example scenarios in which a communications device 204 forms an ad-hoc relay node to facilitate communication of radio signals to communications devices (UEs) 104. In some examples the UEs may be MTC-UEs. As shown in FIG. 2a a base station or eNodeB 101 transmits downlink transmissions 201 via an LTE-type wireless access interface to UEs 104 which as already mentioned may be MTC type UEs. The base station or eNodeB 101 includes a transmitter 101.tx, a receiver 101.rx and a controller or scheduler 101.ct. Correspondingly the UEs 104 includes a transmitter 104.tx, a receiver 104.rx and a controller 104.ct.

As mentioned above, MTC type UEs may be disposed in a remote location such as a basement of a house or within a car and therefore radio transmission and reception from the UEs may be difficult. Furthermore, MTC-UEs themselves are likely to be low power devices and therefore, for example, may be battery powered. As such, the UEs 104 may be limited in their transmission power in addition to being disposed in a location, which makes radio communications difficult. However, the eNodeB 101 is not as limited in transmission power and therefore the downlink transmission signals 201 are more likely to be receivable by the UEs 104 in situations in which up-link transmissions from the MTC-UE may not reach the eNodeB 101. This scenario is shown in FIG. 2a in which a communications apparatus may operate as a relay node 204 provides uplink assistance only for the UE 104 and so receives signals 206 from the UE 104 and retransmit the signals from the relay node 204 to the base station 101 represented by an arrow 208.

The examples shown in FIG. 2b provide an illustration of a mixture of scenarios. A first UE 104.1 does not require assistance for either the uplink or the downlink transmissions 210, 211. A second UE 104.2 is provided with assistance for uplink transmissions only using a relay node 204 and so corresponds to the example provided in FIG. 2a. A third UE 104.3 requires assistance for both downlink and uplink transmissions and so for the downlink the communications apparatus 204 receives the downlink transmissions 214 and retransmits the downlink signals received from the eNB 101 to the UE 104.3 via signals 216. Thus FIG. 2b presents a more realistic scenario in which UEs are deployed within a cell and therefore may either require no assistance for the uplink or the downlink, assistance for the uplink only or assistance for the uplink and the downlink depending on radio communications conditions.

For downlink transmissions, for scenarios in which an MTC-UE is not under the coverage of the eNB directly, the 20 dB coverage extension target can be achieved using power spectral density (PSD) boosting the narrow band virtual (by offloading the resource blocks used by normal LTE usage) [4]; hence this idea has been vigorously followed for PDSCH as well as PBCH and PDCCH (including VC-PDCCH). An illustration of PSD boosting is provided by the example embodiments shown in FIGS. 3 and 4.

Figure 3:
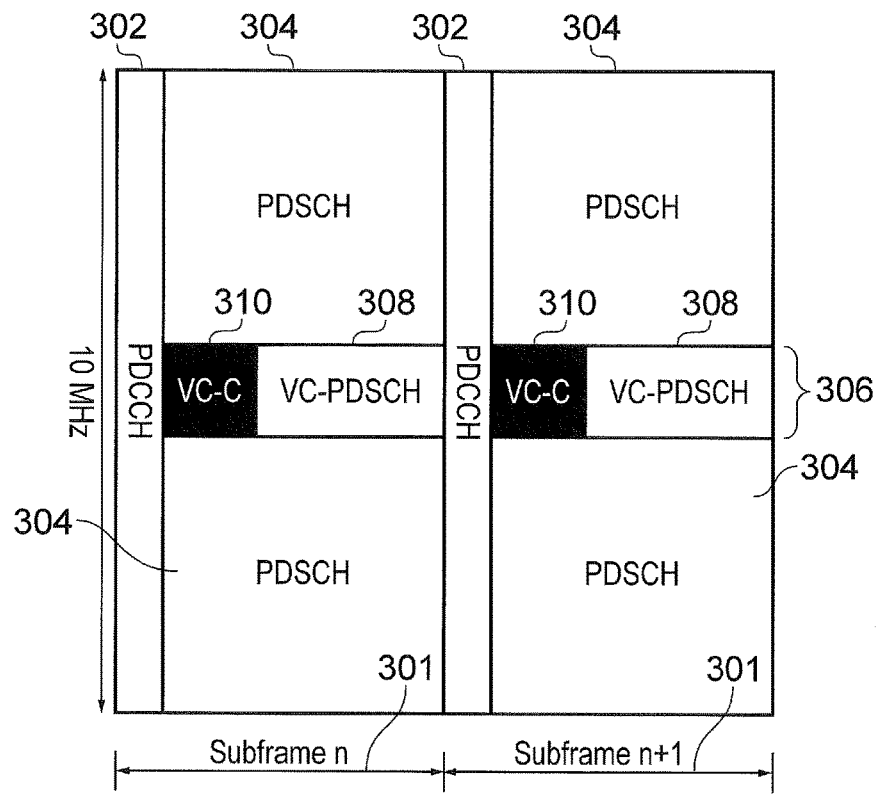
FIG. 3 is a schematic representation of a downlink of a wireless access interface which incorporates a virtual carrier.

As an example, the structure of a downlink shared channel for MTC devices, which is known as a Virtual Carrier (VC-PDSCH) is presented in FIG. 3. The term "virtual carrier" corresponds in essence to a narrowband carrier for MTC-type devices within a host carrier for an OFDM-based radio access technology (such as WiMAX or LTE). The virtual carrier concept is described in a number of co-pending patent applications (including GB 1101970.0 [7], GB 1101981.7 [8], GB 1101966.8 [9], GB 1101983.3 [10], GB 1101853.8 [11], GB 1101982.5 [12], GB 1101980.9 [13] and GB 1101972.6 [14]), the contents of which are incorporated herein by reference.

FIG. 3 provides a simplified example of the downlink of the wireless access interface when provided by OFDM in accordance with LTE. Each subframe 301 is 1 ms in duration and may be further divided into two slots of 0.5 ms duration. The subframes 301 may be grouped together into frames which are formed from ten subframes. Each subframe 301 may include user plane and control plane data, where control plane data may for example be conveyed across a physical downlink control channel (PDCCH) 301 and user plane data conveyed across a physical downlink shared channel (PDSCH) 304. Resources of the subframes are allocated to different UEs such that data intended for a UE is transmitted in resources allocated to the UE, and an indication of the allocation is provided in the control channel PDCCH 201. As shown in FIG. 3, a region 306 comprising a central six resource blocks (RBs), which are the equivalent of 1.4 MHz) of the available bandwidth, provides a reserved set of resources for a VC-PDSCH 308 and a VC-PDCCH 310. As such MTC devices which are reduced capability devices can communicate via an LTE-like wireless access interface using a transmitter and receiver, which is limited in frequency to that of the central region 306.

Figure 4:
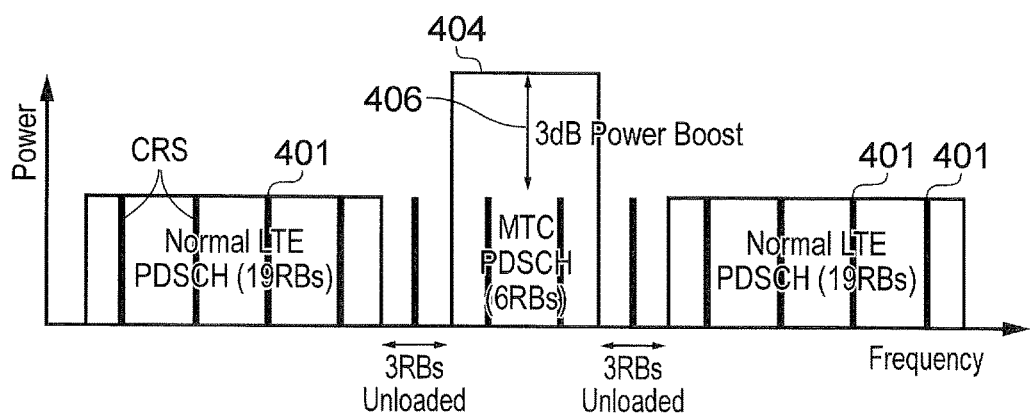
FIG. 4 is a graphical representation illustrating power boosting for certain subcarriers of resource blocks in a power spectral density boosting mode.

FIG. 4 provides a graphical representation of OFDM sub-carriers 401, which represented as power with respect to frequency. As represented by a region 404 and an arrow 406, PSD boosting is applied to VC-PDSCH by unloading some resource blocks from either sides of central 1.4 MHz as illustrated in FIG. 4 wherein it is shown that six resource blocks are unloaded to provide 3 dB boost to VC-PDSCH.

The power of MTC PDSCH is boosted according to the value determined from:

$$10 \log_{10}\left(\frac{M+N}{M}\right)$$

where M and N denote the number of resource blocks allocated to the MTC PDSCH and number of unloaded resource blocks, respectively.

The PSD boosting is an effective approach for downlink coverage improvement when extra time-frequency (TF) resource blocks are available for power aggregation; an ideal implementation scenario is during the night when the traffic in the network is significantly reduced. Therefore, the downlink PSD boosting transmission could be scheduled in such a specific, quieter time period, which does make sense for MTC services that operate on a delay non-sensitive basis. However, in some cases there may not be enough time and frequency resource blocks available in a cell, and in some specific scenarios for example fire alarm, earthquake warning, etc., communications may be preferably done without significant delay. Downlink relay assisted transmission is an alternative for those scenarios. Then the main question is how and when the connection switches between the two approaches.

As a starting proposition, downlink relay assisted transmission would only be used when PSD boosting is not possible. However, the paging of the UE is not straightforward when it cannot read the downlink common channels. In the current LTE paging procedure the MME 110 in the core network knows the location of a UE at the accuracy of Tracking Area (TA), and paging starts in the tracking area where the UE last registered to the network. After the eNBs under the tracking area being paged have sent a paging message in all the cells, the UE is expected to start Random Access procedure in order to establish radio link connection. If within a certain time (set by timers at MME) the UE fails to respond to the page, a new paging message is sent to the tracking area and eventually the UE will be paged in neighbouring tracking areas. The help of Relay Nodes that can connect to the UE with a different, non-3GPP RAT, can greatly facilitate the reduction in paging messages.

Due to the significantly different impact on the radio interface usage (from the occupied resources and period), the availability of PSD boosting can be judged independently depending on:

The viability of PSD boosting PBCH.
The viability of PSD boosting PDSCH/PDCCH.

In the uplink-only relay assisted transmission (as per FIG. 2), where the direct link between the MTC-UE and eNB has been assumed (i.e. PSD boosting) extra round-trip delay is introduced only from uplink MTC UE-to-RN link. However, when the downlink direct link is unavailable, the RN-to-MTC UE link introduces additional delay (as per FIG. 2).

Discovering a relay node 214 which is available to transmit data to a UE 214 on the DL is a technical problem addressed by the present technique.

As will be appreciated from the above explanation, discovering relay nodes 204, which are available to assist in downlink communications to a UE 104.3 represents a technical problem which is addressed by embodiments of the present technique.

Adaptive Protocol for Paging MTC Devices

Example embodiments of the present technique will now be described in which four separate procedures relating to downlink relay assisted transmission are presented, namely, the procedure at the MME, the procedure at the eNB, the procedure at the relay node and the procedure at the MTC-UE, respectively. A timer ($T_{paging}$) and an indicator ($N_{paging}$) are defined in the MME (see FIG. 5). These are defined as:

timer $T_{paging}$: when $t<T_{paging}$ the normal paging will be implemented (first stage of the paging), while $t>T_{paging}$ and the paging still unsuccessful, the PSD boosting or relay node assistance will be applied (second stage of paging).

indicator $N_{paging}$: the exchange signal between the MME and eNBs in the tracking area of the MTC-UE, when $N_{paging}=0$, normal paging will be applied at the eNB. While $N_{paging}=1$, the PSD boosting or relay node assistance will be applied.

In the first instance ($t<T_{paging}$), the ordinary LTE paging should be performed because radio channel conditions for reception at a UE's current location will not be know by the MME and eNB, and may be sufficiently good to receive a first downlink paging message. This is referred to as the first stage of paging. Should paging at the first stage fail, the second stage ($t>T_{paging}$) arises with PSD boosting for paging and/or relay node discovery triggered by the eNB. This approach has an advantage that this would avoid every time activating all the eNBs sending PSD boosted physical channels in all the cells or connecting with multiple relay nodes in the first instance.

As will be explained below FIGS. 7 to 10 include four branches. Two branches are defined at the first stage for procedures at the eNB, the relay node and the UE, depending on the device that acts upon the normal LTE paging message. Branch 1 is defined for the scenario where the MTC-UE (and normal UE) is at a good location, so that the channel condition is strong enough to facilitate LTE downlink and uplink communications directly between the eNB and the UE (without any uplink or downlink relay support).

In branch 2, the downlink and uplink transmission cannot be achieved directly between UE and eNB without relay node support. However, any MTC-UE will sooner or later have something to transmit or it will have to do periodical Tracking Area Updates (TAU). The relay nodes that assist UEs in the cell would have a table of UE identifiers listing the UEs which they have already assisted or may have discovered. When the MME sends a paging request to the eNBs in the tracking area, the paging message sent in a cell is read by all the UEs and also by the relay node. Then the relay node assisted transmission could be triggered by the relay node itself.

Branches 1 and 2 belong to a category where PSD boosting and random relay node discovery (by eNB) are not considered in the first instance of paging ($N_{paging}=0$), which avoids unnecessary resource block PSD boosting and signal exchanging. However, for UEs that are located in poor propagation conditions and have no relay node response on their behalf either, the normal LTE paging on the tracking areas will fail. Eventually, the second paging stage will be triggered by setting the indicator $N_{paging.}=1$.

Embodiments of the present technique can provide an arrangement in which an indication flag $N_{paging}$ in the MME is provided, which guides the eNB on whether to use PSD boosted paging or relay node assisted transmission. This indication flag is exchanged over, for example, the S1 interface between the MME and the eNB. In the first stage $N_{paging}=0$, while after the predefined timer is out of date, $N_{paging}=1$, its value will be sent to the eNBs along with the paging information to trigger the use PSD boosting or random relay node discovery, which are branches 3 and 4, respectively.

When the eNB receives the paging indicator flag $N_{paging}=1$, it will try to find the MTC-UE by either PSD boosting or the relay node discovery process. Cells where PSD boosting is available will page the MTC-UE directly, while the eNB without PSD boosting resources will implement the relay node discovery for the MTC-UE. Depending on the different relay discovery schemes, two cases are considered in the second stage, namely, relay node discovery case 1 and relay node discovery case 2, which are presented in the following sections:

Rely Node Discovery Case 1:

A list of relay node identifiers that are linked to a specific eNB will be retained by the MME. When $N_{paging}=1$, the MME will request the eNBs to page the relay nodes on the list depending on whether the PSD boosting indicator from the eNB is set or not ($N_{psd-paging}$, see the procedure at MME). Only the eNBs without PSD boosting resources available for paging ($N_{psd-paging}=0$) will receive the relay node identifier list along with the MTC-UE discovery request. This would be different from normal paging in that the MME only sends the paging request to a specific eNB and not all of them under the tracking area. Once a radio link connection with relay nodes is established, each relay node will be provided with a request to find and connect to the MTC UE whose identifier is provided by the core network.

All the eNBs with PSD boosting resources available will provide the PSD boosting indicator set ($N_{psd-paging}=1$) to the MME, and the paging of the MTC-UE occurs in normal fashion in the cell with PSD boosting assistance.

Relay Node Discovery Case 2:

A common paging identifier is established which, when present, makes all the Relay Nodes read the paging record and the appended MTC-UE identifier. When $N_{paging}=1$, such a common paging identifier will be sent through the eNBs in the tracking area where the cells cannot provide PSD boosting ($N_{psd-paging}=0$). relay nodes that have been pre-configured to detect the common paging identifier will respond, extract the appended MTC UE identifier and try to connect to the respective MTC-UE.

In the following description of example embodiments of the present technique, procedures at the eNB, the relay node and the UE are presented in four respective sections corresponding to the four cases mentioned above, which each refer to the respective branches 1, 2, 3, 4 where this is appropriate.

Embodiments of the present technique can provide an arrangement in which a communications device can discover communications apparatus, which can act as relay nodes. The communications apparatus may be predesignated or deployed or fixed relay nodes or may be communications devices themselves which are for example provided with a plurality of radio access technologies and so can form an ad-hoc relay node. Ad hoc relay nodes are comprised of communications devices which are provided with more than one radio access technology and are configured to act as relay nodes because they are able to communicate with other communications devices and also a base station (eNodeB) or the mobile radio network. Thus the communications apparatus may itself be a mobile communications device, smart phone or wireless router. The mobile device to relay node communication may therefore be a device-to-device communication as disclosed in our co-pending European patent applications 14153010.5, 14153540.1, 14157187.7, 14154396.7, 14161202.8, 14161201.0, 14161181.4, the contents of which are incorporated herein by reference. A relay node discovery may be performed in accordance with a process disclosed in EP14170122.7, the content of which is incorporated herein by reference.

MME Procedure

Figure 5:
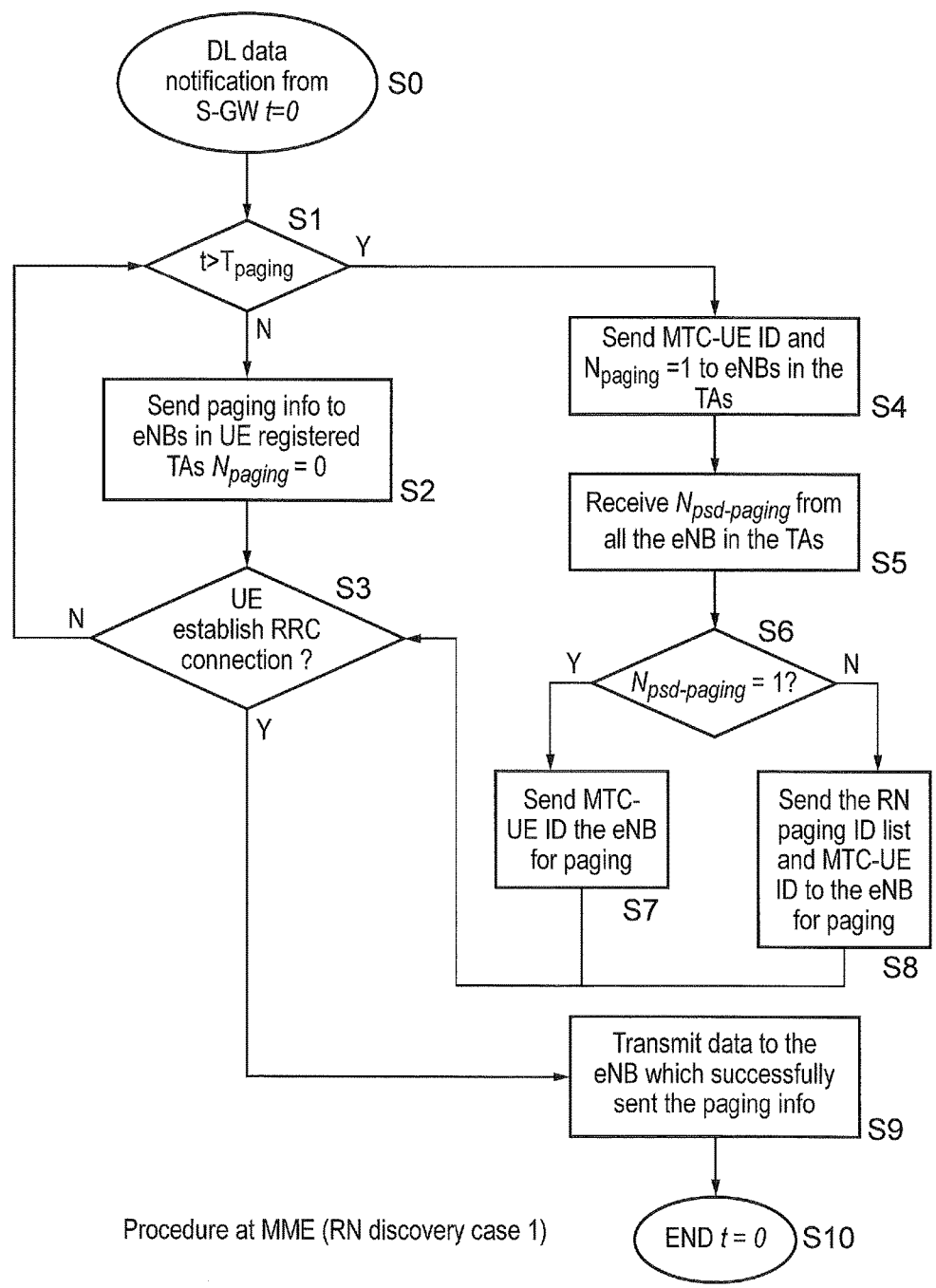
FIG. 5 is an example flow diagram illustrating an operation of a mobility management entity (MME) in which a relay node is discovered by maintaining a list of available relay nodes within a tracking area.
Figure 6:
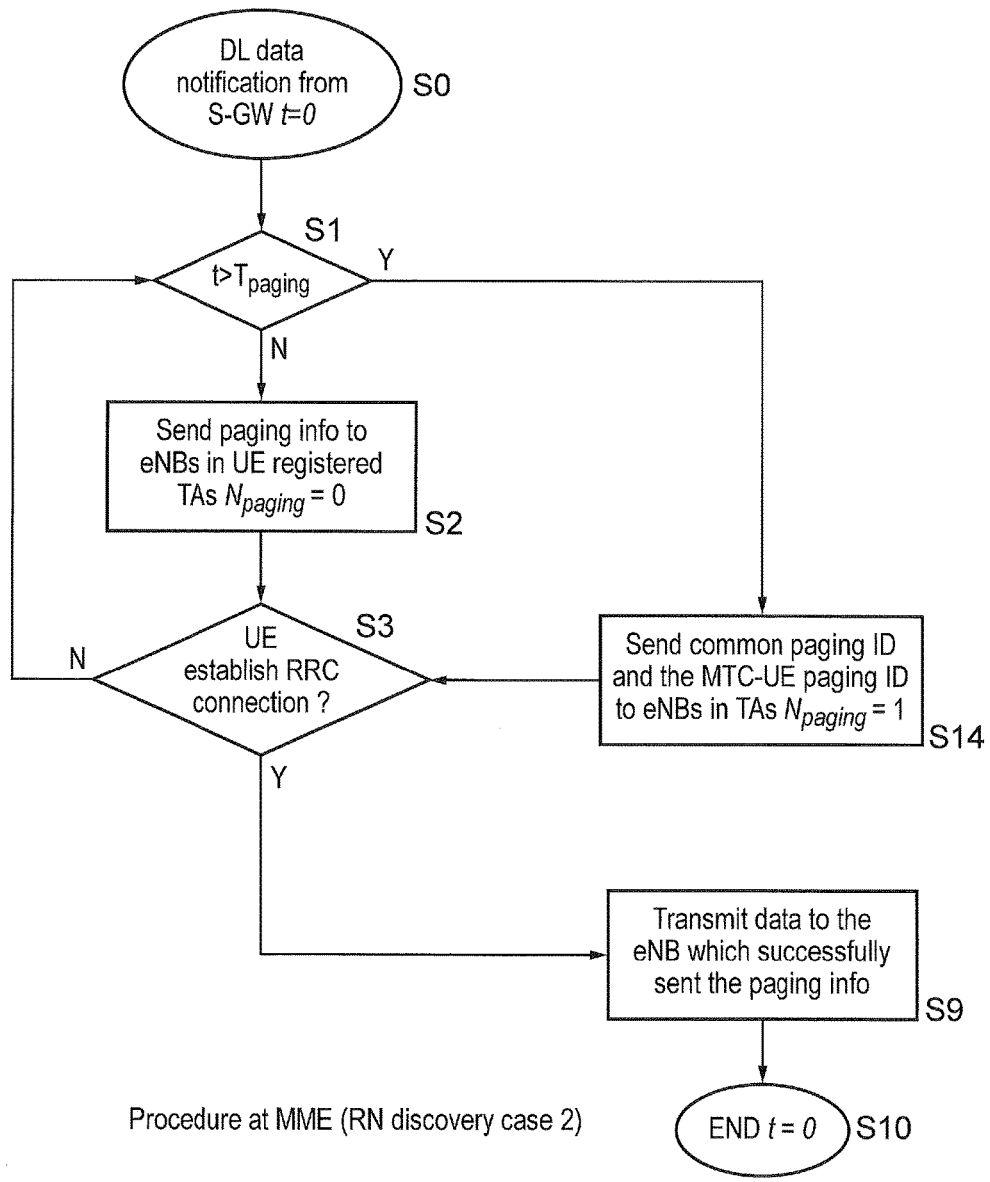
FIG. 6 is an example flow diagram illustrating the operation of a mobility management entity (MME) for an example in which a common paging identifier is used.

An example procedure at the MME is shown in FIG. 5 for the relay node discovery case 1 and FIG. 6 for the relay node discovery case 2. When the MME receives downlink data notification from the serving gateway (S-GW), a timer will be initialized to t=0, and it sends paging message to all eNBs in the tracking area (tracking areas) where the UE last registered.

Then two cases arise depending on the relay node discovery schemes for the cells without available PSD boosting resource. FIG. 5 corresponds to the relay node discovery case 1 while FIG. 6 is for the relay node discovery case 2 described above.

Relay Node Discovery Case 1:

FIG. 5 illustrates the operation of an MME in accordance with relay discovery case 1 in which a list of available relay nodes is provided to each of one or more base stations where the UE may be reached. FIG. 5 is summarised as follows:

S0: The MME firstly receives a notification from the serving gateway (S-GW) that downlink data is available to be transmitted to an MTC type UE. Accordingly, a timer t is set to zero.

S1: At decision point S1 the timer is compared to a paging time $T_{paging}$ and if the time exceeds the paging time then processing proceeds to step S4, otherwise processing proceeds to step S2.

S2: The MME sends paging information to all the eNB's in a tracking area within which the UE has been registered by the MME. The $N_{paging}$ flag is equal to zero to indicate that enhanced paging conditions are not yet applied.

S3: At decision point S3 the MME determines whether the UE has established an RRC connection or not. If no RRC connection has been established then processing proceeds to step S1. If an RRC connection has been established then processing proceeds to step S9.

S4: If the timer has exceeded the $T_{paging}$ time then processing proceeds to step S4 in which the MME sends the MTC UE identifier and sets the $N_{paging}$ flag to be equal to 1 to all the eNB's within the tracking area indicating whether or not they can apply PSD boosting.

S5: The MME then receives the $N_{PSD-paging}$ from all the eNB's in the tracking area.

S6: At decision point S6 the MME determines for each of the eNB's within the tracking area whether the PSD paging flag $N_{PSD-paging}$ is equal to 1 or not. If the paging $N_{PSD-paging}$ flag is set to be equal to 1 then processing proceeds to step S7. Alternatively processing proceeds to step S8.

S7: The MME sends the MTC UE identifier to the eNB concerned for paging with PSD boosting and after processing proceeds to step S3 for confirmation that the UE has established an RRC connection.

S8: If the PSD paging flag $N_{PSD-paging}$ does not equal 1, then the MME sends the relay node paging identifier list and the MTC UE identifier to the eNB in question for paging. Processing then proceeds to step S3 to determine whether a UE has established an RRC connection.

S9: After establishing an RRC connection the relevant bearers are established and the tS-GW will forward the data to the eNB with which the UE has established an RRC connection. Processing then ends at step S10 and t is set to zero.

As will be understood from the flow diagram presented in FIG. 5, when the eNBs in the tracking areas receive the indicator $N_{paging}=1$ from MME, they will feed back an indicator $N_{psd-paging}$ to the MME (step S5 in FIG. 5), where:

When $N_{psd-paging}=1$: the PSD boosting resources for paging the MTC-UE are available When $N_{psd-paging}=0$: the PSD boosting resources for paging the MTC-UE are unavailable Based on the received value of $N_{psd-paging}$ from each specific eNB in the tracking areas, two options are listed in the step S6 of FIG. 5. For the eNBs feeding back $N_{psd-paging}=1$ (have PSD boosting paging resources), the MTC-UE identifier will be sent to the eNBs to page directly (step S7). For the eNBs feeding back $N_{psd-paging}=0$, a list of the relay node identifiers will be sent to the eNBs (do not have PSD boosting paging resources) along with the MTC-UE identifier for relay node discovery. The MME maintains an RN identifier list that links relay nodes to the eNBs under which they have registered, and these relay nodes will be paged independently.

Relay Discovery Case 2:

A common paging identifier is established which, when present, makes all the Relay Nodes read the paging record and the appended MTC UE identifier. The common paging procedure includes the delivery of at least the following information from the MME:

a common paging identifier that makes all the configured relay nodes reachable with one paging message explicit or implicit identification of the MTC-UE that the MME intends to page The common paging identifier should be understood by all of the configured relay nodes that an MTC-UE out of the eNB physical channel coverage is being paged by the MME. The explicit or implicit MTC-UE identification extracted from the common paging information could be, for example, the MTC-UE's IMSI (International mobile subscriber identity) or any other type of identification that can be mapped to the intended MTC-UE uniquely during the RN-to-MTC-UE connection.

The MME will send the common paging identifier along with the MTC-UE identifier to all of the eNBs in the tracking areas. The eNBs that can provide PSD boosting for paging ($N_{psd-paging}=1$) will page the MTC-UE directly and overlook the common paging identifier, while the others ($N_{psd-paging}=0$) will page the common identifier and expect to receive response from the relay nodes that have been configured with capability to read the common paging.

FIG. 6 is a flow diagram which represents the operation of the MME when relay node discovery case 2 is performed in which relay discovery is determined using a common paging identifier. Steps performed in FIG. 6 correspond substantially to those in FIG. 5 and so they are the same step references. However, FIG. 6 differs from this procedure in FIG. 5 by step S14 which replaces steps S4 to S8 in FIG. 5. In step S14 the MME sends a common paging identifier and MTC UE paging identifier to the eNBs in the tracking area and sets the paging flag to be equal to 1. In this case the eNBs proceed to page the MTC UE using the common paging identifier and the MTC's UE paging identifier via the eNB's in the tracking area.

eNB Procedure

Figure 7:
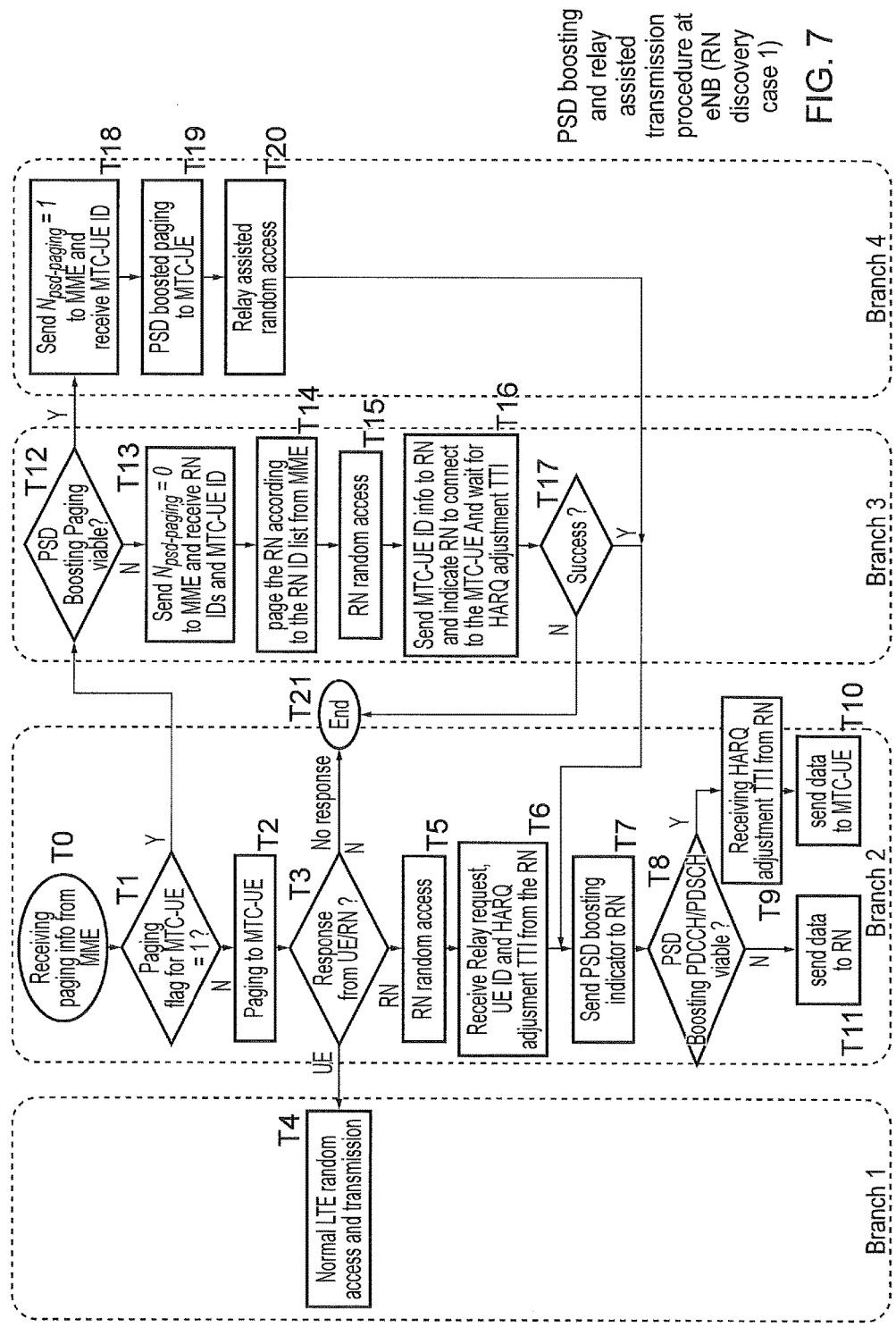
FIG. 7 is a flow diagram illustrating an example operation of a base station (eNB) for example in which the eNB receives a list of available relay nodes within a coverage area.
Figure 8:
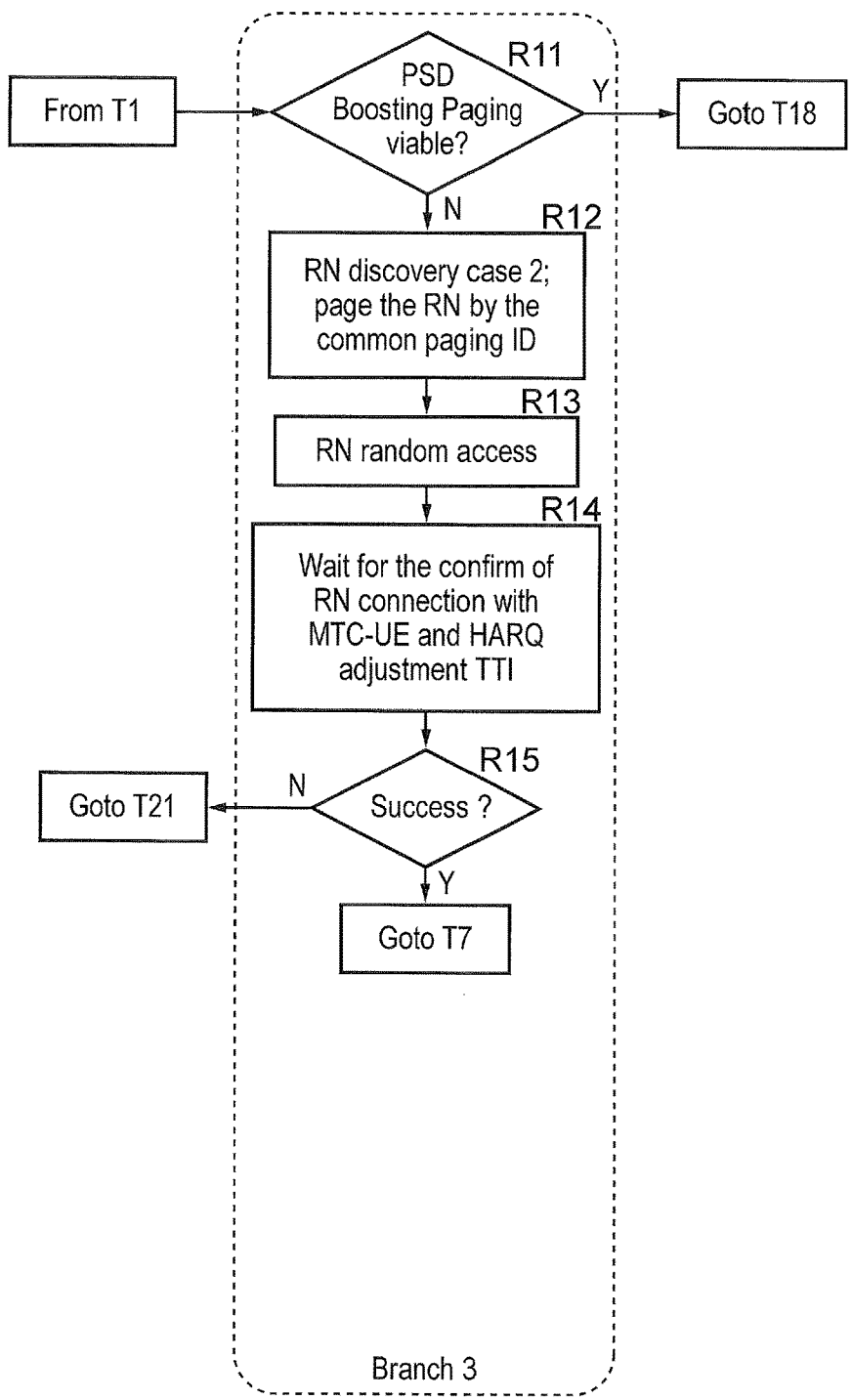
FIG. 8 is an example flow diagram illustrating an example operation of a base station (eNB) in which relay nodes are discovered using a common paging identifier.

The flowchart of the eNB procedure is depicted in FIG. 7 and FIG. 8, where the relay node discovery cases 1 and 2 are separately depicted. Because branches 1, 2 and 4 are identical in the two procedures, only branch 3 is depicted in FIG. 8.

FIG. 7 provides an example flow diagram illustrating the operation of an eNB for the example in which the relay node discovery case 1 is performed. The MME communicates a list of relay nodes which are available within each of the coverage areas of base stations of a tracking area where the UE may be located. FIG. 7 is summarised as follows:

T0: In step T0 the eNB receives paging information from MME.

T1: The eNB at decision point T1 determines whether the paging flag for the MTC UE has been set. If a paging flag has been set for the MTC UE then processing proceeds to decision point T11. Otherwise processing proceeds to step T2.

T2: Step T2 the eNB proceeds to page the MTC UE.

T3: In step T3 the eNB determines whether a response has been received from the UE or a relay node. If no response is received then processing proceeds to terminate in step T21.

T4: If the UE responds to the paging message then processing corresponds to a normal random access procedure in accordance with, for example, an LTE Standard.

T5: If a relay node responds to the paging message then in step T5 the relay node performs a random access procedure with the eNB to establish a connection with the eNB.

T6: In response to the random access procedure the relay node transmits a relay request for the UE identifier and performs a hybrid automatic repeat request (HARQ) process adjusted in accordance with a transmission time interval from the relay node as according to for example our co-pending European patent application no. 14170122.7.

T7: For an example in which power boosting is available then the eNB sends a power boosting indicator to the relay node.

T8: At decision point T8 the eNB determines whether power boosting is available to the eNB through the PDCCH and PDSCH.

T9: If power boosting is not available then the eNB receives the HARQ adjustment TTI from the relay node.

T10: The relevant bearers are then established and the S-GW forwards data to the eNB which consequently sends the data to the MTC UE via this relay node.

T11: At decision point T11, if the eNB determines that PSD boosting is available for the paging messages, then processing proceeds to step T18. Otherwise processing proceeds to step T12.

T12: If PSD boosting for the paging message is not available then the eNB sends the $N_{paging}$ flag equal to zero to the MME and receives the identifier for the relay nodes and the MTC UE identifier.

T13: The eNB then pages the relay node according to the relay nodes paging list received from the MME.

T14: The relay node then performs a random access process to set up a connection with the eNB.

T15: The eNB then sends the MTC UE identifier information to the relay node and indicates to the relay node to connect the MTC UE identifier and wait for hybrid ARQ adjustment time.

T16: At decision point T16 it is determined whether the MTC UE has made a connection via the relay node with the eNB or not. If not then processing proceeds to step T21 and terminates. If the MTC UE has established a connection via the relay node to the eNB then processing proceeds to step T7. If PSD boosting is available to the eNB then the eNB sends the $N_{PSD\text{-}paging}$ flag to 1 to the MME and receives the MTC UE identifier.

T19: The eNB then transmits the paging message with PSD boosting to the MTC UE identifier.

T20: Relay assisted random access is then performed with the eNB.

As will be appreciated from FIG. 7, the procedure is initialized by a paging request from the MME for the MTC-UE arriving at the eNB. Depending on the status of the $N_{paging}$ flag from the MME, the eNB has three types of response expected (step T3 in FIG. 7):

It sends a normal paging message to the MTC-UE, or
It sends the paging message utilizing PSD boosting, or
It discovers a relay node connected to the UE and transmits the paging message via this relay node.

As shown in FIG. 7, depending on the availability of the PSD boosting for PBCH at eNB, two branches follow from step T4. Each of the branches shown in FIG. 7 is explained in the following sections:

Branch 1

Branch 1 corresponds to a MTC-UE that is located at good propagation conditions with sufficiently strong channel to support the direct uplink and downlink communications between the eNB and the MTC-UE. Clearly, branch 1 will be successfully executed in the first stage (and therefore, no stage 2 in the following) by the normal LTE paging and PDCCH/PDSCH transmission.

Branch 2

However, there is a possibility that the normal LTE paging ($N_{paging}=0$) signal cannot reach the MTC-UE directly. When the MME sends a paging request to the eNBs in the tracking area, the paging message sent in a cell is read by all the UEs and also by the relay node. The relay node will check its lookup list to find out whether the MTC-UE that is being paged is on a list with which it was previously able to communicate (see relay node procedure section for details). Should the relay node successfully match the MTC-UE identifier with one of its lookup identifiers, it may respond to the eNB after verifying that the MTC-UE is reachable by this relay node.

In the step T5 of FIG. 7, the relay assisted random access will be operated between the eNB and the UE. As described in [6], the relay request on behalf of MTC-UE and the MTC-UE identifier will be exchanged between eNB and relay node. Different from the relay assisted random access in [6], where uplink-only assistance is considered and a HARQ timeline adjustment is based on the extra delay caused by uplink relay, in the invention, two cases of HARQ timeline adjustment:

Uplink-only relay assisted transmission (FIG. 7)
Both uplink and downlink are relay assisted by the relay node (FIG. 8) are considered, depending on the PSD boosting availability.

When PSD boosting can be done for both paging and data transmission stages, then uplink-only relay assisted transmission will be applied and the relay assisted random access will be similar to [6]. However, two HARQ timeline adjustment TTIs will be calculated at UE/relay node and received by the eNB in case of PSD boosting is unavailable.

When the MTC-UE/relay node is connected to the eNB, the eNB will make another judgment in step T8 before sending the data to the target UE/relay node. The judgment result will be sent to relay node/MTC-UE indicated by the new defined indicator $N_{psd}$:

$N_{psd}=1$: indicate the PSD boosting is available
$N_{psd}=0$: indicate the PSD boosting is unavailable The reason that we make PSD boosting judgment separately on paging and following data/control signal is because paging may occupy much less resources during PSD boosting compared with the following data/control signal. For example the extra PSD boosting resource blocks available for paging do not imply more resource blocks can be reserved for following data and signal transmission to the MTC-UE.

If the extra PSD boosting resource is available for that UE, the downlink transmission will be done directly to the MTC-UE (step T10). In this case, the timeline should be adjusted by eNB since now it will be degraded to the uplink-only relay assisted transmission, where the direct downlink has been reached by PSD boosting.

However, when the result of the judgment is negative, which implies extra resource block for PSD boosting is unavailable and a relay is necessary to bridge the downlink transmission, the ($N_{psd}=0$) indicator would be forwarded to the MTC-UE from the relay node for confirmation. The delay and HARQ timeline adjustment will be set to reflect the fact that both uplink and downlink are relayed by the relay node.

Branch 3

The failures of the direct transmission (branch 1) and relay node initialized response of the normal paging on the behalf of UE (branch 2) will trigger the repeat of paging in the tracking area or nearby tracking areas along with the indicator $N_{paging}=0$ to the eNB. Once $t>T_{paging}$, the indicator $N_{paging}$ will be set to 1 and triggers PSD boosting for paging or causes the eNB to find a relay node for the MTC-UE actively. With the setting of the $N_{paging}$ flag the procedure will go to the step T11 (branch 3). Depending on the availability of the PSD boosting resource blocks for the paging, two extra branches (branch 3 and 4) are introduced.

Branch 3 is the case that the PSD boosting for paging is unavailable, where eNBs will initialize the relay node discovery in the tracking areas. However, depending on the relay node discovery schemes, two cases are considered in FIG. 7 and FIG. 8, respectively.

In the relay node discovery case 1 in FIG. 7, all of the eNBs in the tracking areas will first send the availability of the PSD boosting for paging by the indicator $N_{psd\text{-}paging}$ back to MME in step T12. Multiple relay nodes in the MME paging list will be paged via the eNB and requested to search for the MTC-UE. The procedure is as follows: all the relay nodes in the list receiving the page will start random access (step T14) and will set up an RRC connection. After this the eNB will send MTC-UE identifier to all the relay nodes (step T15) and requests them to find the MTC-UE. The eNB will expect one relay node assisted random access on behalf of the UE and receive the HARQ timeline adjustment TTI (step T15). There is a possibility that multiple relay nodes will try to connect to the same MTC-UE and only one (also in the case that the PSD boosting for paging from other cells are failure) should succeed and be selected as the relay. A successful relay node discovery for the MTC-UE will lead to step T7, and then later steps will be shared with branch 2.

Branch 4

Branch 4 differs from branch 3, because the availability of the PSD boosting for paging will lead the procedure to branch 4. The availability of sufficient resource blocks drives the direct downlink transmission between the MTC-UE and eNB, only uplink relay node assistance is needed, in step T6, the eNB will follow the same judgment as in branches 2 and 3.

Note that branch 3 and branch 4 may be implemented simultaneously in different cells under a tracking area (some cells with PSD boosting will perform branch 4, while other perform branch 3). However, the UE will establish radio link connection and set up the radio bearers only via one eNB. These two cases are summarised as follows:

1) There is Direct Downlink from eNB Through PSD Boosting

Here the UE will know the cell identifier of the serving cell, and would only select a relay node to assist in the uplink if that relay node is connected to the same cell. There is a likelihood that the UE is contacted by a relay node that is camping under a different cell (whilst searching for the paged UE), but is able to reach the UE. The priority would clearly be that the UE would not select that relay node since it is not under the serving cell. Thus there will be no possibility of selecting a different eNB from the downlink one.

2) There is No Direct Downlink from eNB Because of Lack of PSD Boosting

Here there is a likelihood that e.g. two relay nodes that camp under different cells are both able to discover the UE and connect to it. Again, the UE would only choose one, probably determining based on the radio link characteristics of the interface between it and the relay node.

In the relay node discovery case 1, there is a relay node identifier list maintained at the MME which links eNB identifier and relay node identifier. The list could be updated periodically/non-periodically according to the last record of which relay nodes had camped in the eNB in the tracking areas.

An illustration of an operation of the eNB in a situation where the common paging identifier is used to discover relay nodes in accordance with relay node discovery case 2 is represented in FIG. 8 which corresponds to branch 3 showing in FIG. 7. FIG. 8 is summarised as follows:

R11: At decision point R11 the eNB determines whether PSD boosting is available for the paging message or not. If this is not available then processing proceeds to step R12. If PSD boosting is available then processing proceeds to step T18 showing in FIG. 7.

R12: According to relay node discovery case 2, the relay node is paged using the common paging identifier for the MTC UE's.

R13: The relay node then performs a random access procedure in order to set up a connection with the eNB.

R14: The eNB then waits for confirmation that a connection has been made with relay node so that a connection between a relay node and MTC UE has been established for which a HARQ process can be performed with an adjusted transmission time interval.

R15: At decision point R15 it is determined whether a connection has been established via the relay node with the UE or not. If a connection has been established then processing proceeds to step T7. Otherwise processing proceeds to step T21 and processing terminates.

As will be appreciated for the example shown in FIG. 8, the operation of the eNB for relay node discovery case 2 is similar to the case for case 1 shown in FIG. 7, so we have considered only branch 3 is depicted since the other branches are identical to those in FIG. 7. This case is different in step T12 where the common paging scheme (relay node discovery case 2) is employed. In this case, the paging message shall include a common paging identifier which can be read and reacted upon by pre-configured relay nodes, along with an MTC-UE identifier which can map the MTC-UE uniquely. As long as the eNB received the common paging information along with $N_{paging}=1$, the cells without PSD boosting for paging resources will perform the relay node paging using the common paging identifier. The random access procedure follows in step T13 and the relay node will try to connect to the MTC-UE according to the common paging information. As opposed to case 1 in FIG. 7, there is no need for the network to send a request to the relay node asking for the MTC-UE to search. Again, only one relay node should eventually be successful in connecting to the MTC-UE (in the case that the PSD boosting for paging from other cells are a failure). A successful relay node discovery for the MTC-UE will lead to step T7, and then later steps will be shared with branch 2.

Relay Node Procedure

Only three branches (from the four branches for the eNB procedure presented in FIGS. 7 and 8) are present in the relay node procedure, since branch 1 does not use the relay node at all. Any relay node which has been selected for uplink relay assistance on behalf of an MTC-UE will maintain a UE identifier lookup table (see Table 1). The relay node adds the UE identifier of the MTC-UE to this table (there would be an expiry timer after which an identifier is considered stale and discarded). It is clear that only relay nodes that have previously assisted a UE would have its identifier in the table. When the MME sends a paging request to the eNBs in the tracking area, the paging message sent in a cell is read by all the UEs and also by the relay node.

Figure 9:
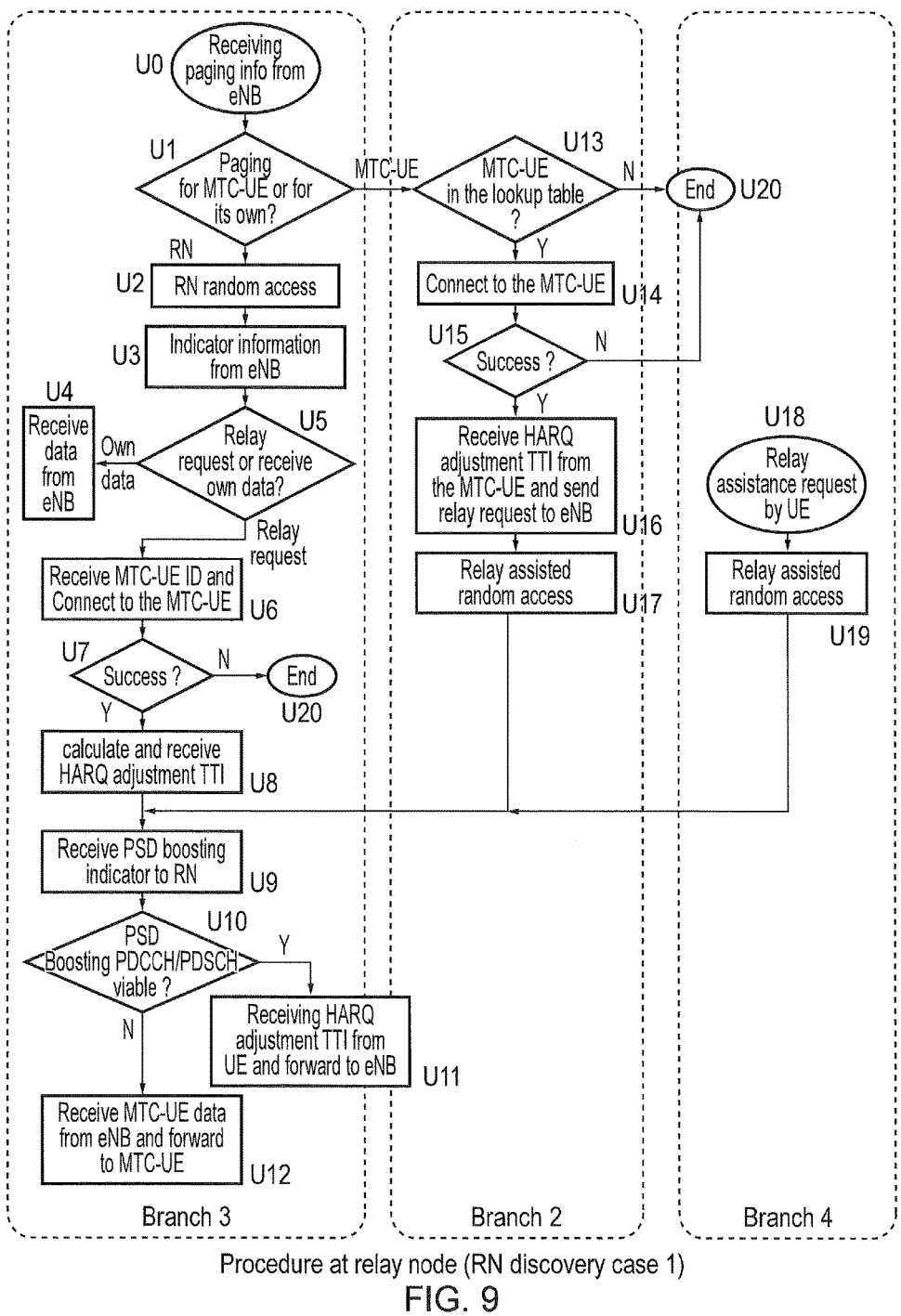
FIG. 9 is an example flow diagram illustrating an example operation of a relay node in which relay nodes are discovered using a list of available relay nodes maintained at a base station (eNB)
Figure 10:
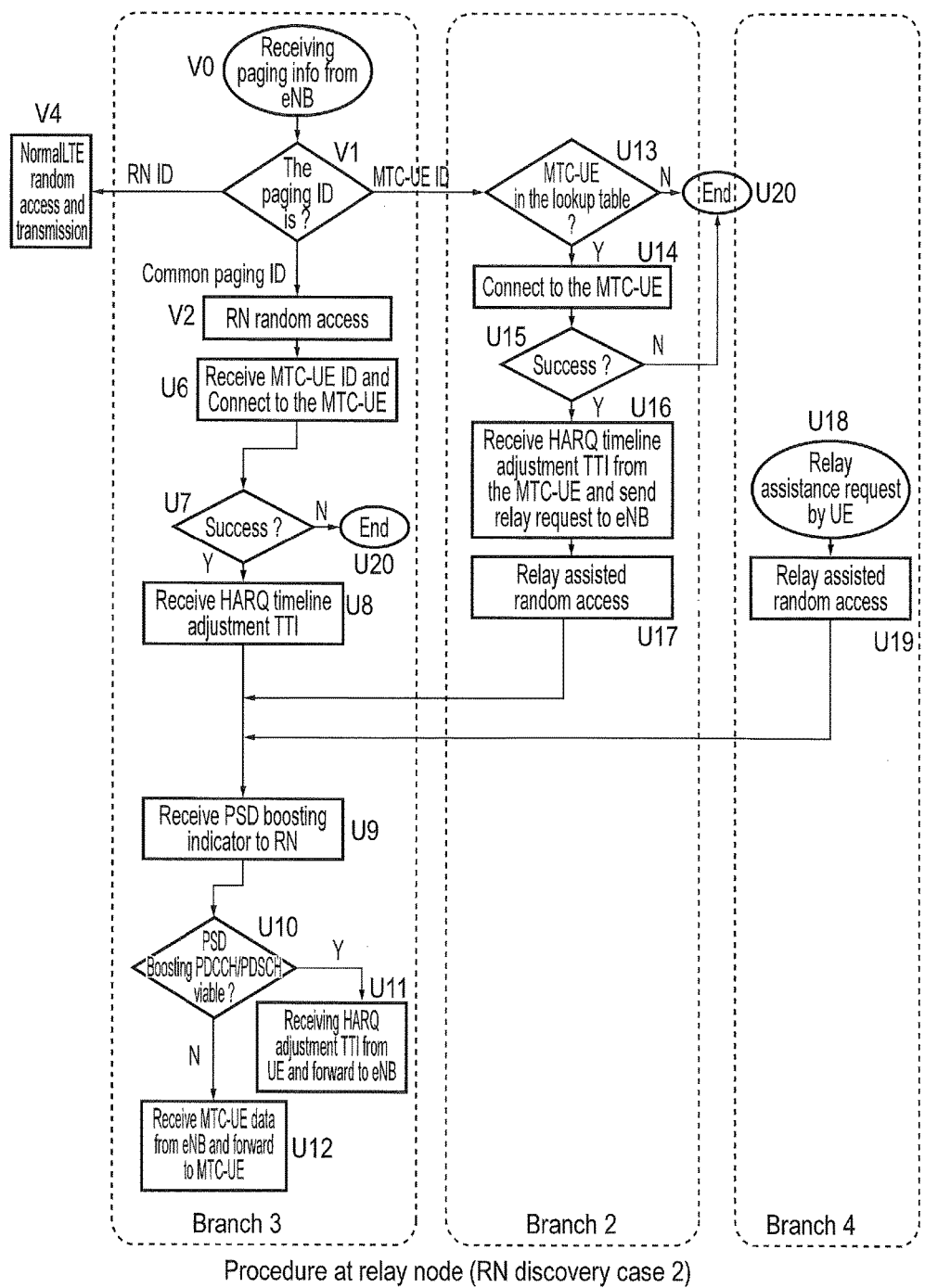
FIG. 10 is an example flow diagram illustrating an operation of a relay node in which the relay node has been disclosed using a common paging identifier.

The flow diagrams in FIGS. 9 and 10 illustrate the operation of a relay node for relay node discovery case 1 and relay node discovery case 2 respectively. Each of the branches 2, 3 and 4 shown in FIGS. 9 and 10 are explained in the following sections:

Branch 3

Two cases will arise corresponding to the two relay node discovery cases in branch 3. Starting from the step U0 of relay node discovery case 1 (FIG. 9), where the relay node(s) receive the paging message from eNB. A relay node will not only check whether its own identifier is included in the paging record but it does the same for all the UEs whose identifier are in the list held at the relay node. In either case, the relay node(s) will start a normal random access in the step 2. Following the random access procedure and RRC connection, the relay node will receive a signal (for example one-bit) from the eNB to indicate whether the forthcoming data in the PSDCH is:

Data for the relay node (e.g. one-bit indicator $N_{data}=0$)

MTC UE identifier to be discovered (e.g. one-bit indicator $N_{data}=1$)

The indicator $N_{data}$ (also could be explained as a relay request when the eNB target to another MTC-UE) will map its value to the above mentioned two options. Obviously, the conventional downlink transmission will be performed (step U4) when the data is for the relay node itself ($N_{data}=0$).

When $N_{data}=1$, the MTC-UE identifier will be obtained from eNB and the relay node(s) will try to connect to the MTC-UE (step U6). The relay node has to calculate and receive the two HARQ timeline adjustment TTIs from MTC-UE (step U8).

Depending on the availability of the PSD boosting resource blocks for data and signalling in the received indicator in step U9, the relay node assisted downlink and uplink (see FIG. 2a) or uplink only assisted (FIG. 2b) will be performed in step 11 and step 12 respectively.

When the common paging relay node discovery scheme is employed in FIG. 10, the relay node will check the following three types of paging identifiers in step U1: a common paging identifier, relay node paging identifier or an MTC-UE identifier.

When the paging identifier matches the relay node's identifier, the normal LTE transmission is expected and implies the forthcoming Transport Blocks from the eNB are intended to the relay node itself, which is the step 4.

When the MTC-UE identifier is paged, branches 2 and 4 will be followed, which will be introduced later.

When a common paging identifier is detected by the relay node, which implies that the eNB is trying to find a relay node for the MTC-UE for downlink transmission. The relay node which successfully connected to the MTC-UE will be selected as the bridge between the eNB and MTC-UE.

Branch 2

Branch 2 corresponds to the case that the normal paging applied and the MTC-UE identifier is in the relay node's lookup list. In this case, the relay node(s) will start to connect to the MTC-UE in FIG. 9 (FIG. 9 and FIG. 10) and only a relay node that successfully connected with the paged UE will pursue the HARQ timeline delay calculation in step U16. Again, the two HARQ timeline delay TTIs will be calculate and received from MTC-UE. The random access is followed in step U17.

Similarly to branch 3, two cases will follow depending on the availability of the PSD boosting resource blocks for data and signalling by indicated in step U9.

Branch 4

Branch 4 corresponds to the case when the PSD boosting for paging is available; the relay node is selected for uplink random access by MTC-UE after a failure of uplink random access (see [1] for detail), while in this case, UE could be aware that the relay node should be chosen for the downlink assisted transmission after the completion of the paging process since the PSD boosting may be unavailable after successful direct paging. Then the relay node is selected for both uplink and downlink assistance and the HARQ timeline adjustment TTI should be calculated based on FIG. 2b. Following the receipt of PSD boosting indicator in step U9, two different relay transmissions will be required.

TABLE 1

Lookup Table for UE identifiers in Paging Records

| UE ID 1 | UE paging ID 1 |
| UE ID 2 | UE paging ID 2 |
| UE ID 3 | UE paging ID 3 |
| . . . | |

The flow diagram in FIG. 9 is summarised as follows:

U0: In step U0 a relay node which may be a communications device, which can operate as a relay node, receives a paging information from an eNB within a coverage area in which the relay node is located.

U1: At decision point U1 the relay node determines whether paging can be performed for the MTC UE on its own. If it can then processing proceeds to step U2, otherwise processing proceeds to step U13.

U2: the relay node proceeds to perform a random access procedure in order to establish connection with the eNB.

U3: The relay node then receives indicator information from the eNB of the MTC UE being paged.

U5: At decision point U5, the relay node determines whether a relay request received from the eNB is for its own data of for an MTC UE. If the data is for the relay node then processing proceeds to step U4. Otherwise processing proceeds to step U6.

U6: The relay node then receives the MTC UE identifier from the eNB and forms a connection with the MTC UE corresponding to that identifier.

U7: At decision point U7 the relay node determines whether it has successfully established a connection with the MTC UE. If not then processing proceeds to step U20 and terminates.

U8: If a successful connection has been established with the MTC UE then at step U8 the relay node calculates and receives a HARQ timing adjustment to the transmission time interval (TTI).

U9: The relay node receives a PSD boosting indicator from the eNB.

U10: At decision point U10 the relay node determines whether PSD boosting is viable for the PDCCH or the PDSCH. If it is viable then processing proceeds to step U11 and the relay node receives HARQ timing adjustment from the UE and forwards this to the eNB.

U12: If PSD boosting is not viable for the PDCCH and PDSCH then the RN receives the MTC UE data from the eNB and forwards this to the MTC UE. Processing then terminates.

U13: If the MTC UE is in a lookup table within the relay node then at decision point U13, processing either terminates if it is not within the lookup table at step U20 or processing proceeds to step U14. If the UE is in the lookup table then the relay node connects with the MTC UE in step U14.

At decision point U15 it is determined whether or not the relay node has established a connection with the MTC UE. If it has not been established then processing proceeds to step U20 and terminates. Otherwise processing proceeds to step U16.

U16: The relay node receives the H ARQ TTI adjustment from the MTC UE and sends the relay request to the eNB for transmission.

U17: The relay node then performs relay assisted random access via the eNB on behalf of the MTC UE and then processing proceeds to step U9.

U18: If the relay node receives a request from a UE to access a relay node then processing proceeds to step U19 and the relay node performs relay assisted random access and then processing then proceeds to step U9.

For the relay node discovery case 2, the common paging identifier is sent to all relay nodes. The process performed by the relay node in this is presented in FIG. 10.

The flow diagram illustrated in FIG. 10 is summarised as follows. As will be appreciated some of the process performed by the relay node for the relay discovery case 2 is common to that of relay discovery case 1 so only the differences will be described. These are as follows:

V1: For relay node discovery case 2, if the common paging identifier is used then at decision point V1 the relay node determines whether the paging identifier is recognised as a common paging identifier. If the relay node does not recognise the common paging identifier then processing proceeds to step U4 and normal LTE random access transmission is performed. Otherwise if the common paging identifier is recognised then processing proceeds to step V2.

V2: The relay node if it recognises the common paging identifier performs a random access to set up connection with the eNB. The processing proceeds as for the flow diagram in FIG. 9 with step U6.

If at decision point V1 the paging identifier is identified as an MTC UE identifier with the common paging identifier then processing proceeds to step U3 in branch 2.

MTC-UE Procedure

Figure 11:
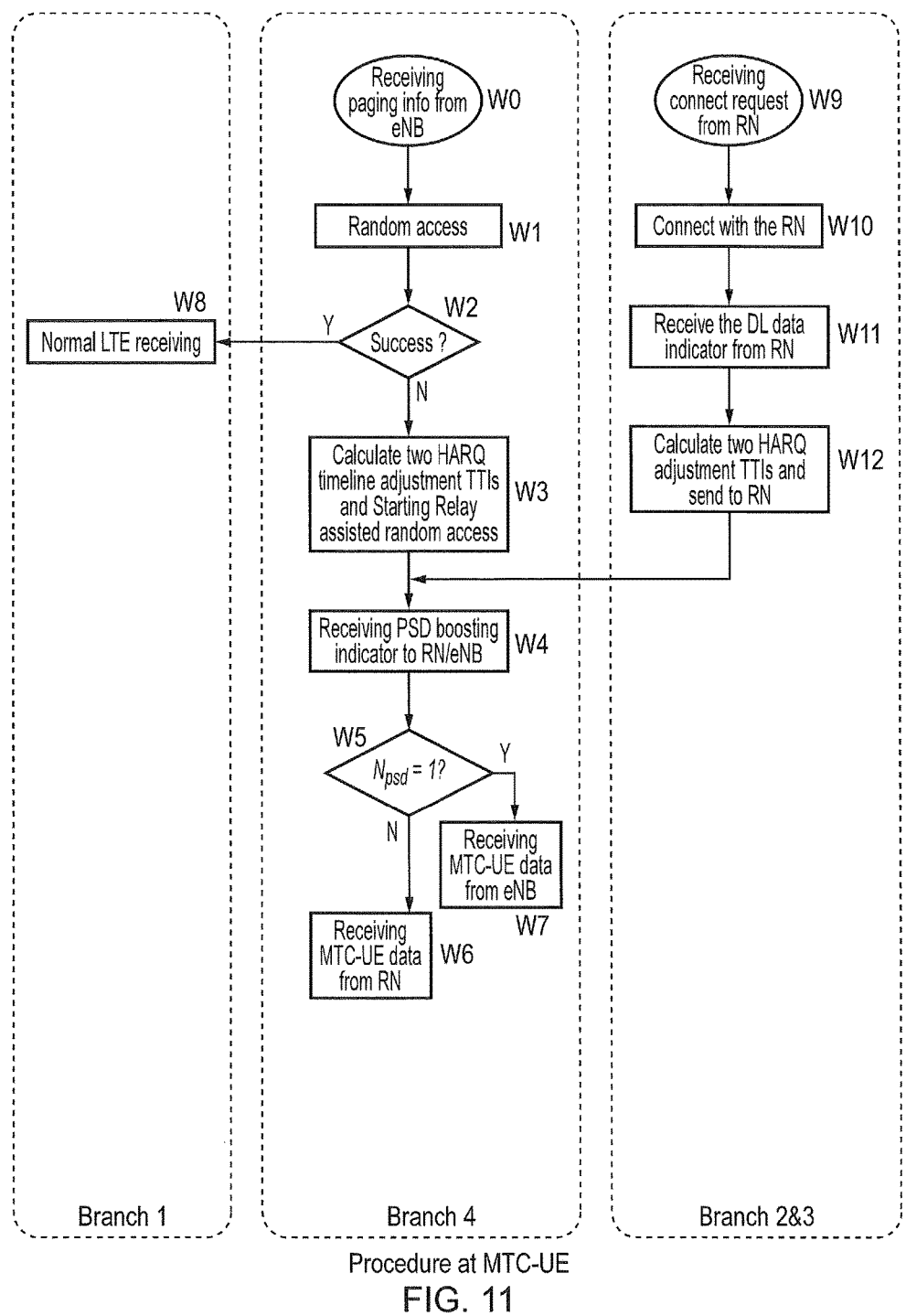
FIG. 11 is an example flow diagram illustrating the operation of a communications device in accordance with the present technique.

A flow diagram representing the operation of the MTC UE is provided in FIG. 11. The starting point is when a paging message from the eNB (step W0) or connection request from a relay node (step W10) is received, respectively. Different branches 1, 2, 3 or 4 described in the following are selected depending on the where the message/request is coming from. In contrast to the operation of the MME, eNB and relay node, in either case of the relay node discovery 1 or 2, the UE will behaviour will be the same.

Branch 1

When the paging message is received directly from the eNB (step 0), the uplink random access procedure will be directly attempted by the UE. A successful connection leads to the case of direct uplink and downlink transmission between the UE and eNB, which corresponds to the case that MTC-UE is under favourable propagation conditions.

Branch 4

The successful receipt of a paging message and following unsuccessful random access procedure will lead to a conclusion that relay node-assisted uplink transmission is needed [6]. A relay node that is used for assisting in the random access procedure may also provide downlink assistance in the following data transmission stage if PSD boosting is consequently unavailable.

The PSD boosting indicator (for example one-bit) that the UE receives from relay node/eNB identifies the two cases of
- PSD boosting will be applied to the following data transmission ($N_{psd}=1$) and in this case, the indicator will be received by the MTC-UE from the eNB directly.
- PSD boosting is unavailable ($N_{psd}=0$) and the indicator will be received from the relay node. The differences of the two cases for the MTC-UE lie in where the UE shall receive the data from.

Branch 2 and 3

Branch 2 and branch 3 operate in exactly the same way as far as the UE procedure is concerned, regardless of whether the MTC-UE is in the relay node lookup list or not. In either case, the UE will rely on the relay node for both uplink and downlink transmission with eNB since the PSD boosting for paging is unavailable in the respective branches of the flow chart.

The flow diagram of FIG. 11 is summarised as follow:

W0: At step W0, the UE firstly receives paging information from the eNB.

W1: The UE then performs a random access in order to set up a connection with the eNB.

W2: At decision point W2 the UE determines whether a successful connection has been set up. If a successful connection has been set up then processing proceeds to step W8. Otherwise processing proceeds to step W3.

W3: The UE then proceeds to calculate two HARQ time adjustment TTI's and begins to perform a random access assisted by the relay node.

W4: If PSD boosting is available then an indicator is received from the relay node or the eNB respectively as the PSD paging flag.

W5: At decision point W5 if the PSD paging assistance flag is set to 1 then processing proceeds to step W7, otherwise processing proceeds to step W6.

W6: If the PSD paging flag is not set then the UE receives MTC UE data from the relay node.

W7: If the PSD paging flag is set then the MTC UE receives data from the eNB using PSD boosting.

W9: In step W9 the UE receives connection request from the relay node.

W10: If the connection request is received then the UE establishes a connection with the relay node.

W11: The UE then receives downlink data indicated from the relay node.

W12: The UE then calculates the two HARQ adjustment TTI values and sends these to the relay node for adjusting the HARQ timing as explained above.

Embodiments of the present technique can provide the following advantages:
- The proposed approaches of the present technique can provide a complete switching scheme between the PSD boosting and relay assisted downlink transmission, which can provide an efficient and flexible method to balance the MTC-UE performance (delay, etc.) and spectrum/energy efficiency.
- An indicator and timer are introduced in the MME and two stages of paging are defined accordingly. An advantage is therefore provided because activating all the eNBs sending PSD boosted physical channels can be avoided in all the cells in each occasion or connecting with multiple relay nodes in the first instance.
- Using a relay node for downlink transmission can extend coverage of an eNB in a coverage hole, without requiring PSD boosting. In addition, less transmission power is required to communicate to the relay node due to reduced path loss as compared to direct transmission to the MTC-UE.
- The downlink relay assisted transmission can improve spectrum efficiency of the area, which is especially true for the scenario when the path loss between MTC-UE and eNB is large and a large amount of resource blocks has to be reserved to save power. It also provides an alternative and flexibility for the MTC-UE to communicate with an eNB with heavy traffic loading period and locations.
- Independently proposed two relay node discovery schemes provide for a possibility of different applications and scenarios when the PSD boosting is unavailable in the paging stage and reduces the unnecessary signal overhead.

Various further aspects and features of the present technique are defined in the appended claims. Various modifications may be made to the embodiments hereinbefore described within the scope of the appended claims. For example although LTE has been presented as an example application, it will be appreciated that other mobile communications systems can be used for which the present technique can be used.

The following numbered clauses define various further aspects and features of the present technique:

1. An infrastructure equipment for forming a base station of a mobile communications network for transmitting data to communications devices or receiving data from communications devices, the infrastructure equipment comprising
   a transmitter configured to transmit signals representing data to the communications devices via a wireless access interface,
   a receiver configured to receive signals from the communications devices via the wireless access interface, and
   a controller for controlling the transmitter and the receiver
      to receive a paging request from a mobility management entity of the mobile communications network for transmission to one of the communications devices,
      in response to transmit a first paging message to the communications device to indicate that the communications device is to receive the data via the wireless access interface, and if a response to the transmitted first paging message is not received within a predetermined time, then if the infrastructure is able to use a power boosting mode, to transmit the first paging message with a boosted power, or if the infrastructure equipment is not able to use a power boosted mode for transmitting, to transmit a second paging message to one or more communications apparatus which can operate as a relay node for the communications device, the second paging message identifying the relay node and the communications device for which the infrastructure equipment is to transmit the data.

2. An infrastructure equipment according to clause 1, wherein the controller in combination with the transmitter to receive an indication from the mobility management entity to transmit the first paging message with a boosted power, and in response to the indication to transmit the first paging message with the boosted power.

3. An infrastructure equipment according to clause 1, wherein the controller is configured to receive from the mobility management entity of the communications network an indication of one or more communications apparatus which are able to act as a relay node for the communications device, and the controller is configured in combination with the transmitter and the receiver to transmit the second paging message to the communications apparatus to act as the relay node for the communications device to receive the data from the infrastructure equipment, which is identified by the indication received from the mobility manager.

4. An infrastructure equipment according to clause 2, wherein if the infrastructure equipment is not able to use a power boosted mode for transmitting, then the controller is configured to provide an indication to the mobility management entity that it cannot use the power boosted mode for transmitting in response to a request from the mobility manager.

5. An infrastructure equipment according to clause 4, wherein the controller is configured to receive a second paging request from the mobility management entity, if the infrastructure equipment is not able to use the power boosted mode, and in response to transmit the second paging message to the one or more communications apparatus which can operate as a relay node for the communications device.

6. A method of transmitting data to a communications device from an infrastructure equipment forming a base station of a mobile communications network, the method comprising receiving a paging request from a mobility management entity of the mobile communications network for transmission to one of the communications devices, in response transmitting a first paging message to the communications device to indicate that the communications device is to receive the data via the wireless access interface, and if a response to the transmitted first paging message is not received from the communications device within a predetermined time, then if the infrastructure is able to use a power boosting mode, transmitting the first paging message with a boosted power, or if the infrastructure equipment is not able to use a power boosted mode for transmitting, transmitting a second paging message to one or more communications apparatus which can operate as a relay node for the communications device, the second paging message identifying the relay node and the communications device for which the infrastructure equipment is to transmit the data.

7. An infrastructure equipment forming a mobility management entity of a mobile communications network, the infrastructure equipment comprising a communications interface for connecting the infrastructure equipment to one or more base stations within a tracking area of the mobile communications network, and a controller configured in response to receiving an indication that data is to be transmitted to a communications device, to transmit via the communications interface a paging request to one or more of the base stations in the tracking area to transmit a first paging message to the communications device indicated in the paging request, and if a response to the transmitted first paging message is not received within a predetermined time, then to transmit via the communications interface a second paging request to the one or more base stations within the tracking area either to transmit the first paging message with a boosted power, if the base station is able to use a power boosting mode, or if the base station is not able to use a power boosted mode for transmitting, to transmit via the communications interface a second paging message to one or more communications apparatus which can operate as a relay node for the communications device, the second paging message identifying the relay node and the communications device for which the base station is to transmit the data.

8. An infrastructure equipment according to clause 7, wherein the controller in combination with the communications interface are configured to transmit a request to each of the one or more base stations within the tracking area for an indication as to whether the base station can transmit using the power boosted mode, to receive an indication from the base station as to whether the base station can transmit using the power boosted mode, and if the base station can transmit using the power boosted mode, and if the base station can transmit using the power boosted mode, to transmit a request to the base station to transmit the first paging message with the power boosted mode, if a response to the transmitted first paging message is not received within the predetermined time, or if the base station cannot transmit using the power boosted mode, to transmit a request to the base station via the communications interface to transmit the second paging message to the one or more communications apparatus which can operate as the relay node for the communications device.

9. An infrastructure equipment according to clause 7, comprising a data store, wherein the controller is configured to store in the data store an indication for each of the one or more base stations within the tracking area of one or more communications apparatus which can act as relay nodes for communications devices, and to transmit to the base stations, which cannot operate with the power boosted mode, a second paging request with an indication of the one or more communications apparatus which can act as relay nodes for the communications device.

10. An infrastructure equipment according to clause 7, wherein the second paging request includes an indication of a common paging identifier, which can be recognized by each of the communications apparatus which can act as a relay node for the communications device to receive the data from the base station, and an indication of the communications device which is to receive the data from the infrastructure equipment.

11. An infrastructure equipment according to clause 7, comprising a data store, wherein the controller is configured
to detect if a communications apparatus has acted as a relay node for one or more communications devices, which have transmitted data to a serving base station or received data from the serving base station via the relay node,
to store in the data store an indication of the one or more communications apparatus which have acted as a relay node, in association with an indication of their serving base station, and
to identify from the indication from the base station on whether it can use power boosting which communications apparatus which has acted as a relay node for the communications device will be requested to act as the relay node for the communications device, and
to transmit the second paging message to the communications apparatus to act as the relay node for the communications device to receive the data from the identified serving base station, which is identified by the indication stored in the data store.

12. An infrastructure equipment according to clause 11, wherein the second paging message comprises a common paging identifier for detection by one or more communications apparatus which can act as a relay node for the communications device to receive the data via the wireless access interface, and an indication of the communications device.

13. A method of controlling transmission of data to a communications device from a base station of a mobile communications network, the method comprising
transmitting via a communications interface a paging request to one or more of the base stations in a tracking area to transmit a first paging message to the communications device indicated in the paging request, and
if a response to the transmitted first paging message is not received within a predetermined time, then
transmitting via the communications interface a second paging request to the one of more base stations within the tracking area either to transmit the first paging message with a boosted power,
if the base station is able to use a power boosting mode, or
if the base station is not able to use a power boosted mode for transmitting, to transmit via the communications interface a second paging message to one or more communications apparatus which can operate as a relay node for the communications device, the second paging message identifying the relay node and the communications device for which the base station is to transmit the data.

REFERENCES

[1] Holma H. and Toskala A., "LTE for UMTS OFDMA and SC-FDMA Based Radio Access", John Wiley & Sons Limited, January 2010.
[2] RP-121441 (Vodafone), "Updated SID on: Provision of low-cost MTC UEs based on LTE", TSG RAN meeting #57, Chicago, USA, 4-7 Sep. 2012.
[3] 3GPP TR 36.888, "Study on provision of low-cost machine communications user equipment based on LTE," v12.0.0, June 2013.
[4] "LTE MTC Research Project Report on Year-1 Achievements", 2013.
[5] European patent application Number EP14177091.7.
[6] European patent application Number EP14170122.7.
[7] UK patent application GB 1101970.0
[8] UK patent application GB 1101981.7
[9] UK patent application GB 1101966.8
[10] UK patent application GB 1101983.3
[11] UK patent application GB 1101853.8
[12] UK patent application GB 1101982.5
[13] UK patent application GB 1101980.9
[14] UK patent application GB 1101972.6
[15] UK patent application GB 1113801.3
[16] UK patent application GB 1121767.6

The invention claimed is:

1. An infrastructure equipment of a base station in a mobile communications network for transmitting data to machine type communication (MTC) communications devices or receiving data from MTC communications devices, the infrastructure equipment comprising:
a transmitter configured to transmit signals representing data to the MTC communications devices via a wireless access interface;
a receiver configured to receive signals from the MTC communications devices via the wireless access interface; and
a controller configured to
control the receiver to receive a paging request from a mobility management entity of the mobile communications network for transmission to a MTC communications device of the MTC communications devices;
control the transmitter to transmit, in response to the paging request, a first paging message to the MTC communications device to indicate that the MTC communications device is to receive the data via the wireless access interface;
control the transmitter to transmit, when the receiver does not receive a response to the transmitted first paging message from the MTC communications device within a predetermined time and the infrastructure equipment is able to use a power boosting mode, the first paging message with a boosted power to indicate that the MTC communications device is to receive the data via the wireless access interface; and
control the transmitter to transmit, when the receiver does not receive the response to the transmitted first paging message from the MTC communications device within the predetermined time and the infrastructure equipment is not able to use a power boosted mode for transmitting, a second paging message to a communications apparatus that operates as a relay node for the MTC communications device, the second paging message identifying the relay node and the MTC communications device for which the infrastructure equipment is to transmit the data.

2. The infrastructure equipment as claimed in claim 1, wherein
the receiver receives an indication from the mobility management entity to transmit the first paging message with a boosted power, and
the controller is configured to control the transmitter to transmit, in response to the indication, the first paging message with the boosted power.

3. The infrastructure equipment as claimed in claim 2, wherein when the infrastructure equipment is not able to use a power boosted mode for transmitting, the controller is configured to provide an indication to the mobility management entity that the power boosted mode cannot be used for transmitting in response to a request from the mobility manager.

4. The infrastructure equipment as claimed in claim 3, wherein the controller is configured to receive a second paging request from the mobility management entity when the infrastructure equipment is not able to use the power boosted mode, and in response to transmit the second paging message to the communications apparatus.

5. The An infrastructure equipment as claimed in claim 1, wherein
the receiver receives, from the mobility management entity of the communications network, an indication of the communications apparatus, and
the controller is configured to control the transmitter to transmit the second paging message to the communications apparatus to act as the relay node for the MTC communications device and to receive the data from the infrastructure equipment, which is identified by the indication received from the mobility manager.

6. The infrastructure equipment as claimed in claim 1, wherein
the MTC communications device is powered by a battery, and
the MTC communications device operates in a low power mode.

7. The infrastructure equipment as claimed in claim 1, wherein the signals are transmitted to the MTC communications devices in a virtual carrier.

8. A method of transmitting data to a machine type communication (MTC) communications device from an infrastructure equipment of a base station in a mobile communications network, the method comprising:
receiving a paging request from a mobility management entity of the mobile communications network for transmission to the MTC communications device;
transmitting, in response to the paging request, a first paging message to the MTC communications device to indicate that the MTC communications device is to receive the data via a wireless access interface;
transmitting, when a response to the transmitted first paging message is not received from the MTC communications device within a predetermined time and the infrastructure equipment is able to use a power boosting mode, the first paging message with a boosted power to indicate that the MTC communications device is to receive the data via the wireless access interface; and
transmitting, when the response to the transmitted first paging message is not received from the MTC communications device within the predetermined time and the infrastructure equipment is not able to use a power boosted mode for transmitting, a second paging message to a communications apparatus which operates as a relay node for the MTC communications device, the second paging message identifying the relay node and the MTC communications device for which the infrastructure equipment is to transmit the data.

9. An infrastructure equipment forming a mobility management entity of a mobile communications network, the infrastructure equipment comprising:
a communications interface for connecting the infrastructure equipment to one or more base stations within a tracking area of the mobile communications network; and
a controller configured to
transmit, via the communications interface in response to receiving an indication that data is to be transmitted to a machine type communication (MTC) communications device, a paging request to a base station of the one or more of the base stations, the paging request requesting to transmit a first paging message to the MTC communications device indicated in the paging request;
transmit, via the communications interface when a response to the transmitted first paging message is not received within a predetermined time and the base station is able to use a power boosting mode, a second paging request to the base station, the second paging request indicating to transmit the first paging message with a boosted power; and
transmit, via the communications interface when the response to the transmitted first paging message is not received within the predetermined time and the base station is not able to use a power boosted mode for transmitting, a second paging message to a communications apparatus that operates as a relay node for the MTC communications device, the second paging message identifying the relay node and the MTC communications device for which the base station is to transmit the data.

10. The infrastructure equipment as claimed in claim 9, wherein the controller is configured to
transmit, via the communications interface, a request to each of the one or more base stations for an indication as to whether the base station can transmit using the power boosted mode,
receive, via the communications interface, an indication from the base station as to whether the base station can transmit using the power boosted mode,
transmit, via the communications interface, a request to the base station to transmit the first paging message with the power boosted mode, when a response to the transmitted first paging message is not received within the predetermined time, and when the base station cannot transmit using the power boosted mode, and transmit, via the communications interface, a request to the base station via the communications interface to transmit the second paging message to the communications apparatus.

11. The infrastructure equipment as claimed in claim 9, further comprising a data store, wherein
the controller is configured to
store, in the data store, an indication for each of the one or more base stations of the communications apparatus, and
transmit to base stations, of the one or more base stations which cannot operate with the power boosted mode, the second paging request with an indication of the communications apparatus.

12. The infrastructure equipment as claimed in claim 9, wherein the second paging request includes an indication of a common paging identifier, which is recognized by the communications apparatus to receive the data from the base station, and an indication of the MTC communications device which is to receive the data from the infrastructure equipment.

13. The infrastructure equipment as claimed in claim 9, further comprising a data store, wherein the controller is configured to detect whether the communications apparatus has acted as the relay node for the MTC communications device,
store, in the data store, an indication of the communications apparatus in association with an indication of the serving base station, identify, from the indication from the base station, whether the communications apparatus will be requested to act as the relay node for the MTC communications device, and transmit the second paging message to the communications apparatus to act as the relay node for the MTC communications device to receive the data from the identified serving base station, which is identified by the indication stored in the data store.

14. The infrastructure equipment as claimed in claim 13, wherein the second paging message comprises a common paging identifier for detection by the communications apparatus to receive the data via the wireless access interface, and an indication of the MTC communications device.

15. Electronic circuitry for a base station of a mobile communications network for transmitting data to machine type communication (MTC) communications devices or receiving data from MTC communications devices, the electronic circuitry comprising:

transmitter circuitry configured to transmit signals representing data to the MTC communications devices via a wireless access interface;

receiver circuitry configured to receive signals from the MTC communications devices via the wireless access interface; and controller circuitry configured to control the receiver circuitry to receive a paging request from a mobility management entity of the mobile communications network for transmission to a MTC communications device of the MTC communications devices;

control the transmitter circuitry to transmit, in response to the paging request, a first paging message to the MTC communications device to indicate that the MTC communications device is to receive the data via the wireless access interface;

control the transmitter circuitry to transmit, when the receiver circuitry does not receive a response to the transmitted first paging message from the MTC communications device within a predetermined time and the base station is able to use a power boosting mode, the first paging message with a boosted power to indicate that the MTC communications device is to receive the data via the wireless access interface; and control the transmitter circuitry to transmit, when the receiver circuitry does not receive the response to the transmitted first paging message from the MTC communications device within the predetermined time and the base station is not able to use a power boosted mode for transmitting, a second paging message to a communications apparatus that operates as a relay node for the MTC communications device, the second paging message identifying the relay node and the MTC communications device for which the infrastructure equipment is to transmit the data.

16. Electronic circuitry for a mobility management entity of a mobile communications network, the electronic circuitry comprising:

communications interface circuitry for connecting the mobility management entity to one or more base stations within a tracking area of the mobile communications network; and controller circuitry configured to transmit, via the communications interface circuitry in response to receiving an indication that data is to be transmitted to a machine type communications (MTC) communications device, a paging request to a base station of the one or more of the base stations, the paging request requesting to transmit a first paging message to the MTC communications device indicated in the paging request;

transmit, via the communications circuitry when a response to the transmitted first paging message is not received within a predetermined time and the base station is able to use a power boosting mode, a second paging request to the base station, the second paging request indicating to transmit the first paging message with a boosted power; and transmit, via the communications interface circuitry when the response to the transmitted first paging message is not received within the predetermined time and the base station is not able to use a power boosted mode for transmitting, a second paging message to a communications apparatus that operates as a relay node for the MTC communications device, the second paging message identifying the relay node and the MTC communications device for which the base station is to transmit the data.

* * * * *